(12) United States Patent
Gwon et al.

(10) Patent No.: US 11,837,695 B2
(45) Date of Patent: Dec. 5, 2023

(54) OXIDE, METHOD OF PREPARING THE SAME, SOLID ELECTROLYTE INCLUDING THE OXIDE, AND ELECTROCHEMICAL DEVICE INCLUDING THE OXIDE

(71) Applicant: Samsung Electronics Co., Ltd., Suwon-si (KR)

(72) Inventors: Hyeokjo Gwon, Hwaseong-si (KR); Sungkyun Jung, Suwon-si (KR); Ryounghee Kim, Uiwang-si (KR); Sewon Kim, Suwon-si (KR); Jusik Kim, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 406 days.

(21) Appl. No.: 16/925,547

(22) Filed: Jul. 10, 2020

(65) Prior Publication Data
US 2021/0043966 A1   Feb. 11, 2021

(30) Foreign Application Priority Data

Aug. 5, 2019   (KR) .................. 10-2019-0094937
Jul. 7, 2020   (KR) .................. 10-2020-0083272

(51) Int. Cl.
  *H01M 10/0525*   (2010.01)
  *H01M 10/0562*   (2010.01)

(52) U.S. Cl.
  CPC ... *H01M 10/0562* (2013.01); *H01M 10/0525* (2013.01); *H01M 2300/0077* (2013.01)

(58) Field of Classification Search
  CPC ......... H01M 10/0562; H01M 10/0525; H01M 2300/0077
  See application file for complete search history.

(56) References Cited

U.S. PATENT DOCUMENTS 6,402,795 B1   6/2002   Chu et al.
6,485,622 B1   11/2002   Fu
(Continued)

FOREIGN PATENT DOCUMENTS

CN   102769147 A   11/2012
CN   102780030 A   11/2012
(Continued)

OTHER PUBLICATIONS

Bachman et al., "Inorganic Solid-State Electrolytes for Lithium Batteries: Mechanisms and Properties Governing Ion Conduction", Chemical Reviews, 2016, 116, 140-162.
(Continued)

*Primary Examiner* — Osei K Amponsah
(74) *Attorney, Agent, or Firm* — CANTOR COLBURN LLP

(57) ABSTRACT

An oxide including a compound represented by Formula 1:

$$(Li_xM1_y)(M2)_{3-\delta}(M3)_{2-\omega}O_{12-z}X_z \quad \text{Formula 1}$$

wherein, in Formula 1,
  $6 \leq x \leq 8$, $0 \leq y < 2$, $-0.2 \leq \delta \leq 0.2$, $-0.2 \leq \omega \leq 0.2$, and $0 \leq z \leq 2$;
  M1 is a monovalent cation, a divalent cation, a trivalent cation, or a combination thereof;
  M2 is a monovalent cation, a divalent cation, a trivalent cation, or a combination thereof;
  M3 is a monovalent cation, a divalent cation, a trivalent cation, a tetravalent cation, a pentavalent cation, a hexavalent cation, or a combination thereof;
  wherein at least one of M1, M2, or M3 includes at least four elements; and
  X is a monovalent anion, a divalent anion, a trivalent anion, or a combination thereof.

29 Claims, 10 Drawing Sheets

(56) References Cited

U.S. PATENT DOCUMENTS

| | | | |
|---|---|---|---|
| 7,901,658 B2 | 3/2011 | Weppner et al. | |
| 8,828,580 B2 | 9/2014 | Visco et al. | |
| 8,986,895 B2 | 3/2015 | Ohta et al. | |
| 10,128,533 B2 | 11/2018 | Yamamoto et al. | |
| 10,566,655 B2 | 2/2020 | Kataoka et al. | |
| 2011/0244337 A1* | 10/2011 | Ohta | C04B 35/4885 |
| | | | 429/322 |
| 2018/0006326 A1 | 1/2018 | O'Neill et al. | |

FOREIGN PATENT DOCUMENTS

| | | | | |
|---|---|---|---|---|
| CN | 102780031 A | | 11/2012 | |
| CN | 109888374 A | * | 6/2019 | ........ H01M 10/0562 |
| KR | 1020180054879 A | | 5/2018 | |

OTHER PUBLICATIONS

Dhivya et al., "Effect of Simultaneous Substitution of Y and Ta on the Stabilization of Cubic Phase, Microstructure, and Li+ Conductivity of Li7La3Zr2O12 Lithium Garnet", Applied Materials & Interfaces, 2014, 6, 17606-17615.

Narayanan et al., "Macroscopic and microscopic Li+ transport parameters in cubic garnet-type'Li6.5La2.5Ba0.5ZrTaO12" as probed by impedance spectroscopy and NMR, RSC Advances, 2012,2, 2553-2561.

Richards et al., "Interface Stability in Solid-State Batteries", Chemistry of Materials, 2016, 28, 266-273.

Tong et al., "Highly conductive Li Garnets by a Multielement Doping Strategy", Inorganic Chemistry, 2015, 54, 3600-3607.

Extended European Search Report dated Jan. 18, 2021 of EP Patent Application No. 20185736.4.

King Xiang et al., "Dual regulation of Li+ migration of Li6.4La3Zr1.4M0.6O12 (M = Sb, Ta, Nb) by bottleneck size and bond length of M-O," Journal of the American Ceramic Society, 2020, pp. 2483-2490, vol. 103.

Yedukondalu Meesala et al., "An efficient multi-doping strategy to enhance Li-ion conductivity in the garnet-type solid electrolyte Li7La3Zr2O12," Journal of Materials Chemistry A, Mar. 9, 2019, vol. 7, pp. 8589-8601.

* cited by examiner

Li (M1 site)=7

La (M2 site)=3

Multi-atoms (M3 site)=2

OXIDE, METHOD OF PREPARING THE SAME, SOLID ELECTROLYTE INCLUDING THE OXIDE, AND ELECTROCHEMICAL DEVICE INCLUDING THE OXIDE

CROSS-REFERENCE TO RELATED APPLICATION

This application claims priority to and the benefit of Korean Patent Application No. 10-2019-0094937, filed on Aug. 5, 2019, in the Korean Intellectual Property Office, and Korean Patent Application No. 10-2020-0083272, filed on Jul. 7, 2020, in the Korean Intellectual Property Office, and all the benefits accruing therefrom under 35 U.S.C. § 119, the contents of which are incorporated herein in their entirety by reference.

BACKGROUND

1. Field

The present disclosure relates to an oxide, a method of preparing the oxide, a solid electrolyte including the oxide, and an electrochemical device including the oxide.

2. Description of Related Art

The demand for lithium secondary batteries has increased due to their high electrochemical capacity, high operation potential, and excellent charge/discharge cycle characteristics. Lithium secondary batteries are used in portable information terminals, portable electronic devices, small-sized home electricity storage devices, motorcycles, electric vehicles, and hybrid electric vehicles. Improved safety and increased performance of lithium secondary batteries are needed as lithium secondary batteries are increasingly used in a variety of devices.

Commercially available lithium secondary batteries use a liquid electrolyte which easily ignites when exposed to water in the air, and thus stability is an issue with these batteries. Stability issues have become prominent with the emergence of electric vehicles. Accordingly, all-solid-state secondary batteries using a solid electrolyte formed of an inorganic material have been studied with the purpose of improving safety. All-solid-state secondary batteries have received attention as next-generation secondary batteries based on their stability, high energy density, high output, long lifespan, simplified preparation process, increased size, compact size, and reduced price.

An all-solid-state secondary battery includes a cathode, a solid electrolyte, and an anode. It is important for the solid electrolyte to have high ionic conductivity and low electron conductivity. Examples of a solid electrolyte of an all-solid-state secondary battery include a sulfide-based solid electrolyte or an oxide-based solid electrolyte.

Although an oxide-based solid electrolyte does not generate a toxic material during the preparation process and stability of the material is acceptable, the ionic conductivity of an oxide-based solid electrolyte at room temperature is low compared to that of a sulfide-based solid electrolyte. Therefore, there remains a need for an improved oxide-based solid electrolyte having high ionic conductivity at room temperature.

SUMMARY

Provided is an oxide having an improved ionic conductivity and a method of preparing the oxide.

Provided is a solid electrolyte including the oxide.

Provided is an electrochemical device including the oxide.

Additional aspects will be set forth in part in the description which follows and, in part, will be apparent from the description.

According to an aspect, an oxide includes a compound represented by Formula 1:

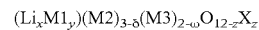  Formula 1 wherein, in Formula 1,
6≤x≤8, 0≤y<2, −0.2≤δ≤0.2, −0.2≤ω≤0.2, and 0≤z≤2;
M1 is a monovalent cation, a divalent cation, a trivalent cation, or a combination thereof,
M2 is a monovalent cation, a divalent cation, a trivalent cation, or a combination thereof,
M3 is a monovalent cation, a divalent cation, a trivalent cation, a tetravalent cation, a pentavalent cation, a hexavalent cation, or a combination thereof, and
wherein at least one of M1, M2, or M3 includes at least four elements; and X is a monovalent anion, a divalent anion, a trivalent anion, or a combination thereof.

According to an aspect, a method of preparing an oxide includes:
providing a precursor mixture including a lithium precursor, an M1 precursor, an M2 precursor, an M3 precursor, and optionally an X precursor; and
heat-treating the precursor mixture in an oxidizing gas to prepare a compound represented by Formula 1:

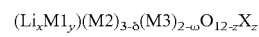  Formula 1 wherein, in Formula 1,
6≤x≤8, 0≤y<2, −0.2≤δ≤0.2, −0.2≤ω≤0.2, and 0≤z≤2;
M1 is a monovalent cation, a divalent cation, a trivalent cation, or a combination thereof,
M2 is a monovalent cation, a divalent cation, a trivalent cation, or a combination thereof,
M3 is a monovalent cation, a divalent cation, a trivalent cation, a tetravalent cation, a pentavalent cation, a hexavalent cation, or a combination thereof, and
wherein at least one of M1, M2, or M3 includes at least four elements; and
X is a monovalent anion, a divalent anion, a trivalent anion, or a combination thereof.

According to an aspect, a solid electrolyte includes the oxide. According to an aspect, a solid electrolyte includes a binder and the oxide.

According to an aspect, an electrochemical device includes a cathode, an anode, and a solid electrolyte, wherein the cathode, the anode, the solid electrolyte, or a combination thereof, includes the oxide.

The electrochemical device may be an electrochemical battery wherein the solid electrolyte may be between the cathode and the anode.

The solid electrolyte may be in the form of a protective layer, wherein the protective layer is on the cathode, the anode, or a combination thereof.

According to an aspect, an oxide includes a compound represented by Formula 1:

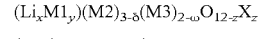  Formula 1 wherein, in Formula 1,
6≤x≤8, 0≤y<2, −0.2≤δ≤0.2, −0.2≤ω≤0.2, and 0≤z≤2;
M1 is hydrogen, iron, gallium, aluminum, boron, beryllium, or a combination thereof;

M2 is lanthanum, barium, or a combination thereof; and

M3 is zirconium, hafnium, tin, niobium, scandium, indium, or a combination thereof;

wherein at least one of M1, M2, or M3 includes at least four elements; and

X is a halogen, a pseudohalogen, or a combination thereof.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
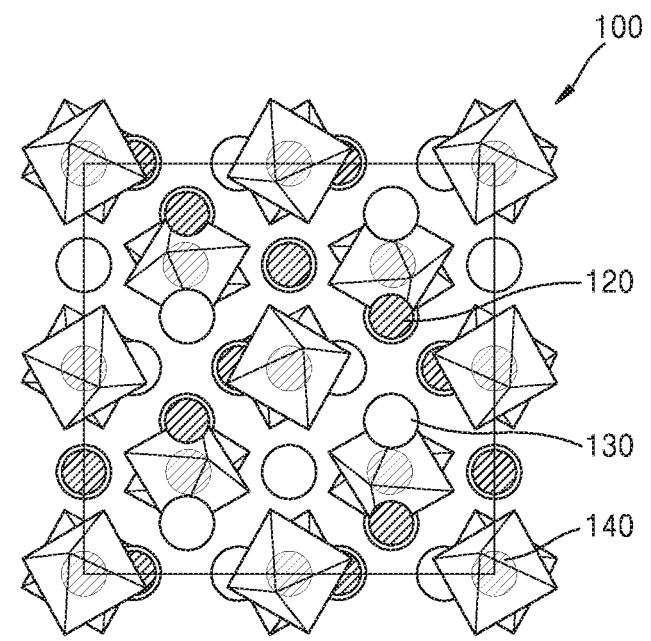
FIG. 1 is a schematic view of an embodiment of a crystal structure of an oxide.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, according to an embodiment, an oxide, a method of preparing the oxide, a solid electrolyte including the oxide, and an electrochemical device including the oxide will be described in further detail.

According to an embodiment, an oxide includes a compound represented by Formula 1:

$$(Li_xM1_y)(M2)_{3-\delta}(M3)_{2-\omega}O_{12-z}X_z \quad \text{Formula 1}$$

in Formula 1, $6 \leq x \leq 8$, $0 \leq y < 2$, $-0.2 \leq \delta \leq 0.2$, $-0.2 \leq \omega \leq 0.2$, and $0 \leq z \leq 2$;

M1 is a monovalent cation, a divalent cation, a trivalent cation, or a combination thereof, M2 is a monovalent cation, a divalent cation, a trivalent cation, or a combination thereof, M3 is a monovalent cation, a divalent cation, a trivalent cation, a tetravalent cation, a pentavalent cation, a hexavalent cation, or a combination thereof, and wherein at least one of M1, M2, or M3 comprises at least four elements; and X is a monovalent anion, a divalent anion, a trivalent anion, or a combination thereof.

For example, in the oxide, M1, M2, or a combination thereof, may include at least one element, and M3 may include a multiple element combination, e.g., at least four elements.

In the oxide according to an embodiment, M1, M2, or a combination thereof, may include at least two elements, and M3 may comprise a multiple element combination, e.g. a combination of at least four elements.

The at least one of M1, M2, or M3 comprising at least four elements may, for example, refer to a combination comprising at least four elements.

The combination comprising at least four elements may be a first combination comprising at least four elements, in which the at least four elements may be on to an M1 site, an M2 site, or an M3 site in a structure of the oxide, and one to three different elements may be on to the remaining sites in the structure of the oxide. For example, an element may be on the M1 site, two different elements may be on the M2 site, and four different elements may be on the M3 site.

The combination comprising at least four elements may be a second combination comprising at least four elements, in which the at least four elements may be on both the M1 site and the M2 site, both the M2 site and the M3 site, or both the M1 site and the M3 site, and one to three different elements may be on the remaining sites.

The combination comprising at least four elements may be a third combination comprising at least four elements, in which the at least four elements may be introduced to all the M1 site, the M2 site, and the M3 site.

As used herein, the term "at least four elements" may refer to, for example, four, five, six, or seven elements.

For example, in the oxide, at least one of M1 or M2 may include at least two elements; M3 may include at least four elements or, for example, a multiple element combination of four or five elements; and z may be 0, or X may be F.

In Formula 1, M2 may be La, Ba, or a combination thereof; M3 may include zirconium (Zr) hafnium (Hf), tin (Sn), niobium (Nb), scandium (Sc), indium (In), or a combination thereof, and at least four elements or, for example, an element combination of four or five elements; and z may be 0, or X may be F.

For example, in Formula 1, the monovalent anion as X may be a halogen, a pseudohalogen, or a combination thereof; the divalent anion as X may be $S^{2-}$ or $Se^{2-}$, and the trivalent anion as X may be $N^{3-}$.

In formula 1, $6.6 \leq x \leq 8$, $6.7 \leq x \leq 7.5$, or $6.8 \leq x \leq 7.1$.

As used herein, the term "pseudohalogen" refers to a molecule that is formed of at least two electronegative atoms similar to halogens in a free state and that generates anions similar to halide ions. Examples of the pseudohalogen may include cyanide, cyanate, thiocyanate, azide, or a combination thereof.

Examples of the halogen may include iodine (I), chlorine (Cl), bromine (Br), fluorine (F), or a combination thereof.

An example of the trivalent anion may be $N^{3-}$.

In order to increase a lithium ionic conductivity of an oxide solid electrolyte having a garnet structure, a method of reducing an amount of lithium in the oxide solid electrolyte has been suggested by introducing a small amount of dopant to the oxide solid electrolyte.

However, when this method is used, the amount of lithium of the oxide solid electrolyte may decrease and thus may limit an increase in the ionic conductivity, and when an oxide with a decreased amount of lithium is disposed on lithium metal, interfacial stability between the oxide and lithium metal may deteriorate.

Therefore, provided is an oxide that has increased ionic conductivity by stabilizing a cubic phase of the oxide. Without wishing to be bound by theory, it is understood that by increasing a configuration entropy of the cubic phase by increasing the number of kinds of elements at a specific site of a garnet structure or garnet-like crystal structure, a reduction in the amount of lithium is prevented. An amount of lithium in the oxide does not decrease when at least four elements are introduced to at least one of the M1, M2, or M3 sites of the oxide of Formula 1; and thus provided is an oxide with improved lithium stability, e.g. stability towards reduction or reduction stability, compared to those of an oxides without the additional elements.

The oxide may be electrically neutral. To provide electrical neutrality of the oxide, a $Li^+$ vacancy may be introduced to the oxide. Here, the introduced vacancy may become a site capable of $Li^+$ hopping, and thus an activation energy for Li migration may decrease. Also, as described above, the oxide may comprise a cubic phase, and thus may have a low activation energy. When the activation energy decreases, an ionic conductivity at a low temperature may further increase.

The oxide may have a garnet structure, and may have a cubic phase. An increase of the configuration entropy of the oxide will described in detail hereinafter.

A composition of an oxide 100 having a garnet structure may be expressed as $A_xX_3Q_2O_{12}$, ($6 \leq x \leq 10$), which contains an A-site 120, an X-site 130, and a Q-site 140, as shown in FIG. 1. Here, elements located at A, X, and Q sites may have oxygen coordinates different from one another.

A garnet structure can be polymorphic, and can have a tetragonal phase or a cubic phase, and the cubic phase can be more stable than the tetragonal phase at a relatively high temperature. In the composition of $Li_7X_3Q_2O_{12}$, a cubic phase can have improved stability at a relatively high temperature, and a tetragonal phase can have improved stability at room temperature, and thus an oxide at room temperature having a garnet structure has a tetragonal phase.

In the oxide according to an embodiment, when the number of different elements located at a specific crystallographic site of A, X, or Q increases, a phase stability may increase as a Gibbs free energy (ΔG) decreases based on an increase of a configuration entropy (ΔS) as shown in Equation 1. The increased Gibbs free energy allows for room temperature stabilization of the oxide by decreasing a stability of the cubic phase.

$$\Delta G = \Delta H - T\Delta S$$
$$S = S_{therm} + S_{config}$$
$$\Delta S \uparrow \rightarrow \Delta G \downarrow$$

Equation 1

Unlike commercially available oxides having a garnet structure, the oxide according to an embodiment may lower a phase stability of a cubic phase without decreasing a lithium amount by doping a dopant in the oxide or performing a high-temperature heat-treating process and thus may contain a cubic phase. FIG. 1 is a schematic view of a crystal structure of the oxide according to an embodiment.

Referring to FIG. 1, the oxide 100 according to an embodiment has a garnet crystal structure including Li (M1 site) 120, La (M2 site) 130, and multi-atoms (M3 site) 140.

Unlike a prior art oxide having a garnet crystal structure including a doped element, the oxide according to an embodiment does not have a Li vacancy, and thus a lithium amount in the oxide is maintained. Also, the number of elements in a specific crystallographic site of a garnet structure in the oxide increases, which induces an increase in a configuration entropy, and thus a cubic phase may be stabilized, and an ionic conductivity may be improved. Here, the elements occupying the specific crystallographic site, e.g., M3 site, may be at least four elements, or four or five elements.

Also, X may be introduced to an oxygen (O) site of the oxide. A halogen, such as chlorine or fluorine, or a pseudohalogen, may be introduced as X. When the oxide introduced with a halogen or pseudohalogen is used in the preparation of a solid electrolyte, a passive layer including fluorine may be formed between a lithium metal electrode and a solid electrolyte containing the oxide according to an embodiment, which may improve lithium stability of the solid electrolyte, and LiF or LiCl may exist in a grain boundary region of the solid electrolyte, which may increase a Li ionic conductivity at the grain boundary.

The oxide may be used as a lithium conductor.

In Formula 1, examples of the monovalent cation may comprise Na, K, Rb, Cs, H, or Fr, and examples of the divalent cation may comprise Mg, Ca, Ba, or Sr. Examples of the trivalent cation may comprise In, Sc, Cr, Au, B, Al, or Ga, and examples of the tetravalent cation may comprise Sn, Ti, Mn, Ir, Ru, Pd, Mo, Hf, Ge, V, or Si.

Examples of the pentavalent cation may include Nb, Ta, Sb, V, or P. M3 may comprise a tetravalent cation. In an aspect, M3 comprises a tetravalent cation. In an aspect, M3 may be four tetravalent cations (Combination 1);

a combination of two tetravalent cations, one trivalent cation, and one pentavalent cation (Combination 2); a combination of two tetravalent cation, one divalent cation, and one hexavalent cation (Combination 3); a combination of three tetravalent cations, one trivalent cation, and one pentavalent cation (Combination 4); a combination of three tetravalent cations, one divalent cation, and one hexavalent cation (Combination 5);

a combination of one tetravalent cation, two trivalent cations, and two pentavalent cations (Combination 6); a combination of four tetravalent cations, one trivalent cation, and one pentavalent cation (Combination 7); a combination of four tetravalent cations, one divalent cation, and one hexavalent cation (Combination 8); a combination of two tetravalent cations, two trivalent cations, and two pentavalent cations (Combination 9); or a combination of two tetravalent cations, two divalent cations, and two hexavalent cations (Combination 10).

Examples of Combination 1 may include Zr/Hf/Sn/Ru, Zr/Hf/Sn/Mo, Zr/Hf/Sn/Ir, Zr/Hf/Sn/Pd, Zr/Hf/Ru/Ir, Zr/Hf/Ru/Mo, Zr/Hf/Ru/Pd, Zr/Hf/Ir/Mo, Zr/Hf/Ir/Pd, Zr/Hf/Mo/Pd, or a combination thereof.

Examples of Combination 2 may include Zr/Hf/In/Nb, Zr/Hf/In/Ta, Zr/Hf/In/Sb, Zr/Hf/Sc/Nb, Zr/Hf/Sc/Ta, Zr/Hf/Sc/Sb, Zr/Hf/Cr/Nb, Zr/Hf/Cr/Ta, Zr/Hf/Cr/Sb, Sn/Hf/In/Nb, Sn/Hf/In/Ta, Sn/Hf/In/Sb, Sn/Hf/Sc/Nb, Sn/Hf/Sc/Ta, Sn/Hf/Sc/Sb, Sn/Hf/Cr/Nb, Sn/Hf/Cr/Ta, Sn/Hf/Cr/Sb, Zr/Sn/In/Nb, Zr/Sn/In/Ta, Zr/Sn/In/Sb, Zr/Sn/Sc/Nb, Zr/Sn/Sc/Ta, Zr/Sn/Sc/Sb, Zr/Sn/Cr/Nb, Zr/Sn/Cr/Ta, Zr/Sn/Cr/Sb, or a combination thereof.

Examples of Combination 3 may include Zr/Hf/Ni/Ru, Zr/Hf/Ni/Mo, Zr/Hf/Cu/Ru, Zr/Hf/Cu/Mo, Zr/Hf/Mg/Ru, Zr/Hf/Mg/Mo, Sn/Hf/Ni/Ru, Sn/Hf/Ni/Mo, Sn/Hf/Cu/Ru, Sn/Hf/Cu/Mo, Sn/Hf/Mg/Ru, Sn/Hf/Mg/Mo, Zr/Sn/Ni/Ru, Zr/Sn/Ni/Mo, Zr/Sn/Cu/Ru, Zr/Sn/Cu/Mo, Zr/Sn/Mg/Ru, Zr/Sn/Mg/Mo, or a combination thereof.

Examples of Combination 4 may include Zr/Hf/Sn/In/Nb, Zr/Hf/Sn/In/Ta, Zr/Hf/Sn/In/Sb, Zr/Hf/Sn/Sc/Nb, Zr/Hf/Sn/Sc/Ta, Zr/Hf/Sn/Sc/Sb, Zr/Hf/Sn/Cr/Nb, Zr/Hf/Sn/Cr/Ta, Zr/Hf/Sn/Cr/Sb, Zr/Hf/Ru/In/Nb, Zr/Hf/Ru/In/Ta, Zr/Hf/Ru/In/Sb, Zr/Hf/Ru/Sc/Nb, Zr/Hf/Ru/Sc/Ta, Zr/Hf/Ru/Sc/Sb, Zr/Hf/Ru/Cr/Nb, Zr/Hf/Ru/Cr/Ta, Zr/Hf/Ru/Cr/Sb, Zr/Mo/Sn/In/Nb, Zr/Mo/Sn/In/Ta, Zr/Mo/Sn/In/Sb, Zr/Mo/Sn/Sc/Nb, Zr/Mo/Sn/Sc/Ta, Zr/Mo/Sn/Sc/Sb, Zr/Mo/Sn/Cr/Nb, Zr/Mo/Sn/Cr/Ta, Zr/Mo/Sn/Cr/Sb, or a combination thereof.

Examples of Combination 5 may include Zr/Hf/Sn/Ni/Ru, Zr/Hf/Sn/Ni/Mo, Zr/Hf/Sn/Cu/Ru, Zr/Hf/Sn/Cu/Mo, Zr/Hf/Sn/Mg/Ru, Zr/Hf/Sn/Mg/Mo, Zr/Hf/Pd/Ni/Ru, Zr/Hf/Pd/Ni/Mo, Zr/Hf/Pd/Cu/Ru, Zr/Hf/Pd/Cu/Mo, Zr/Hf/Pd/Mg/Ru, Zr/Hf/Pd/Mg/Mo, or a combination thereof.

Examples of Combination 6 may include Zr/In/Sc/Nb/Ta, Zr/In/Sc/Nb/Sb, Zr/In/Sc/Ta/Sb, Zr/In/Cr/Nb/Ta, Zr/In/Cr/Nb/Sb, Zr/In/Cr/Ta/Sb, Zr/Cr/Sc/Nb/Ta, Zr/Cr/Sc/Nb/Sb, Zr/Cr/Sc/Ta/Sb, Hf/In/Sc/Nb/Ta, Hf/In/Sc/Nb/Sb, Hf/In/Sc/Ta/Sb, Hf/In/Cr/Nb/Ta, Hf/In/Cr/Nb/Sb, Hf/In/Cr/Ta/Sb, Hf/Cr/Sc/Nb/Ta, Hf/Cr/Sc/Nb/Sb, Hf/Cr/Sc/Ta/Sb, Sn/In/Sc/Nb/Ta, Sn/In/Sc/Nb/Sb, Sn/In/Sc/Ta/Sb, Sn/In/Cr/Nb/Ta, Sn/In/Cr/Nb/Sb, Sn/In/Cr/Ta/Sb, Sn/Cr/Sc/Nb/Ta, Sn/Cr/Sc/Nb/Sb, Sn/Cr/Sc/Ta/Sb, or a combination thereof.

Examples of Combination 7 may include Zr/Hf/Sn/Ru/In/Nb, Zr/Hf/Sn/Ru/In/Ta, Zr/Hf/Sn/Ru/In/Sb, Zr/Hf/Sn/Ru/Sc/Nb, Zr/Hf/Sn/Ru/Sc/Ta, Zr/Hf/Sn/Ru/Sc/Sb, Zr/Hf/Sn/Ru/Cr/Nb, Zr/Hf/Sn/Ru/Cr/Ta, Zr/Hf/Sn/Ru/Cr/Sb, Zr/Hf/Sn/Mo/In/Nb, Zr/Hf/Sn/Mo/In/Ta, Zr/Hf/Sn/Mo/In/Sb, Zr/Hf/Sn/Mo/Sc/Nb, Zr/Hf/Sn/Mo/Sc/Ta, Zr/Hf/Sn/Mo/Sc/Sb, Zr/Hf/Sn/Mo/Cr/Nb, Zr/Hf/Sn/Mo/Cr/Ta, Zr/Hf/Sn/Mo/Cr/Sb, or a combination thereof.

Examples of Combination 8 may include Zr/Hf/Sn/Mn/Ni/Ru, Zr/Hf/Sn/Mn/Ni/Mo, Zr/Hf/Sn/Mn/Cu/Ru, Zr/Hf/Sn/Mn/Cu/Mo, Zr/Hf/Sn/Mn/Mg/Ru, Zr/Hf/Sn/Mn/Mg/Mo, Zr/Hf/Sn/Pd/Ni/Ru, Zr/Hf/Sn/Pd/Ni/Mo, Zr/Hf/Sn/Pd/Cu/Ru, Zr/Hf/Sn/Pd/Cu/Mo, Zr/Hf/Sn/Pd/Mg/Ru, Zr/Hf/Sn/Pd/Mg/Mo, or a combination thereof.

Examples of Combination 9 may include Zr/Hf/In/Sc/Nb/Ta, Zr/Hf/In/Sc/Nb/Sb, Zr/Hf/In/Sc/Ta/Sb, Zr/Hf/In/Cr/Nb/Ta, Zr/Hf/In/Cr/Nb/Sb, Zr/Hf/In/Cr/Ta/Sb, Zr/Hf/Cr/Sc/Nb/Ta, Zr/Hf/Cr/Sc/Nb/Sb, Zr/Hf/Cr/Sc/Ta/Sb, or a combination thereof.

Examples of Combination 10 may include Zr/Hf/Cu/Ni/Ru/Mo, Zr/Sn/Cu/Ni/Ru/Mo, Zr/Mn/Cu/Ni/Ru/Mo, Zr/Pd/Cu/Ni/Ru/Mo, Hf/Sn/Cu/Ni/Ru/Mo, Hf/Mn/Cu/Ni/Ru/Mo, Hf/Pd/Cu/Ni/Ru/Mo, Sn/Mn/Cu/Ni/Ru/Mo, Sn/Pd/Cu/Ni/Ru/Mo, or a combination thereof.

In a combination, the solidus notation, i.e., "/," means that the indicated elements are present in any stoichiometry.

The total number of elements in Combinations 1 to 10 may be 2-ω (where −0.2≤ω≤0.2). For example, a mixing ratio of elements that constitute a combination may vary so that the total number of elements in Combinations 1 to 10 is 2. For example, when the combination has four different elements, examples of a mixing ratio of the four elements may include 5:5:5:5, 4:6:4:6, 6:4:6:4, 4:4:6:6, 6:6:4:4, 3:3:7:7, 7:7:3:3, 8:2:8:2, 7:3:7:3, 8:8:2:2, or 2:2:8:8.

When the combination has five different elements, examples of a mixing ratio of the five elements may include 4:4:4:4:4, 3:5:3:5:4, 5:3:5:3:4, 3:5:4:3:5, or 5:3:4:5:3.

The compound represented by Formula 1 may be an oxide represented by Formula 2:

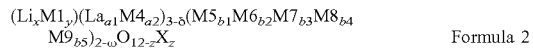

$$(Li_xM1_y)(La_{a1}M4_{a2})_{3-\delta}(M5_{b1}M6_{b2}M7_{b3}M8_{b4}M9_{b5})_{2-\omega}O_{12-z}X_z \quad \text{Formula 2}$$

in Formula 2,

M1 may be hydrogen (H), iron (Fe), gallium (Ga), aluminum (Al), boron (B), beryllium (Be), or a combination thereof, M4 may be barium (Ba), calcium (Ca), strontium (Sr), yttrium (Y), bismuth (Bi), praseodymium (Pr), neodymium (Nd), actinium (Ac), samarium (Sm), gadolinium (Gd), or a combination thereof, and M5 to M9 may each independently be zirconium (Zr), hafnium (Hf), tin (Sn), niobium (Nb), titanium (Ti), vanadium (V), chromium (Cr), manganese (Mn), cobalt (Co), nickel (Ni), copper (Cu), molybdenum (Mo), tungsten (W), tantalum (Ta), magnesium (Mg), technetium (Tc), ruthenium (Ru), palladium (Pd), iridium (Ir), scandium (Sc), cadmium (Cd), indium (In), antimony (Sb), tellurium (Te), thallium (Tl), platinum (Pt), silicon (Si), aluminum (Al) or a combination thereof; 6≤x≤8, 0≤y<2, −0.2≤δ≤0.2, −0.2≤ω≤0.2, 0≤z≤2; a1+a2=1, wherein 0<a1≤1, 0≤a2<1, b1+b2+b3+b4+b5=1, wherein 0<b1<1, 0<b2<1, 0<b3<1, 0<b4<1, and 0≤b5<1; and X may be a monovalent anion, a divalent anion, a trivalent anion, or a combination thereof, M5 to M9 are different from each other.

In Formula 1, M5 may be zirconium (Zr), hafnium (Hf), or a combination thereof. Also, for example, b1 to b5 may each independently be in a range of about 0.1 to about 0.9, for example, about 0.2 to about 0.8, about 0.3 to about 0.7, or about 0.4 to about 0.6.

Regarding the oxide according to an embodiment, the compound represented by Formula 1 may be a compound represented by Formula 3:

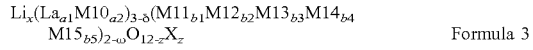

$$Li_x(La_{a1}M10_{a2})_{3-\delta}(M11_{b1}M12_{b2}M13_{b3}M14_{b4}M15_{b5})_{2-\omega}O_{12-z}X_z \quad \text{Formula 3}$$

in Formula 3,

M10 may be barium (Ba), calcium (Ca), strontium (Sr), yttrium (Y), bismuth (Bi), praseodymium (Pr), neodymium (Nd), actinium (Ac), samarium (Sm), gadolinium (Gd), or a combination thereof, M11 may be zirconium (Zr), hafnium (Hf), or a combination thereof, and M12 to M15 may each independently be zirconium (Zr), hafnium (Hf), tin (Sn), niobium (Nb), titanium (Ti), vanadium (V), chromium (Cr), manganese (Mn), cobalt (Co), nickel (Ni), copper (Cu), molybdenum (Mo), tungsten (W), tantalum (Ta), magnesium (Mg), technetium (Tc), ruthenium (Ru), palladium (Pd), iridium (Ir), scandium (Sc), cadmium (Cd), indium (In), antimony (Sb), tellurium (Te), thallium (Tl), platinum (Pt), silicon (Si), aluminum (Al) or a combination thereof; 6≤x≤8, −0.2≤δ≤0.2, −0.2≤ω≤0.2, and 0≤z≤2; a1+a2=1, wherein 0<a1≤1, 0≤a2<1, b1+b2+b3+b4+b5=1, wherein 0<b1<1, 0<b2<1, 0<b3<1, 0<b4<1, and 0<b5<1; and X may be a monovalent anion, a divalent anion, a trivalent anion, or a combination thereof.

In Formula 3, M10 may be barium (Ba), M11 may be zirconium (Zr), M12 may be hafnium (Hf), and M13 to M15 may each independently be tin (Sn), niobium (Nb), titanium (Ti), vanadium (V), chromium (Cr), manganese (Mn), cobalt (Co), nickel (Ni), copper (Cu), molybdenum (Mo), tungsten (W), tantalum (Ta), magnesium (Mg), technetium (Tc), ruthenium (Ru), palladium (Pd), iridium (Ir), scandium (Sc), cadmium (Cd), indium (In), antimony (Sb), tellurium (Te), thallium (Tl), platinum (Pt), silicon (Si), or a combination thereof; and z may be 0, or X may be F or Cl if z is not 0.

In Formula 3, for example, M13 to M15 may each independently be Sn, Nb, Sc, In, or a combination thereof; and z may be 0, or X may be F or Cl if z is not 0.

In Formula 3, for example, b1 to b5 may each independently be in a range of about 0.1 to about 0.9, or, for example, about 0.2 to about 0.8, about 0.3 to about 0.7, or about 0.4 to about 0.6.

When an anion X substitutes some sites of oxygen, a Li ionic conductivity may increase as a result of an inductive effect. Also, when a passive layer including F is formed, lithium stability may improve; and since the existence of LiF or LiCl at a grain boundary region, a Li ionic conductivity at the grain boundary may increase.

For example, the oxide may be $Li_xLa_3Zr_{b1}Hf_{b2}Sc_{b3}Nb_{b4}Sn_{b5}O_{12}$ (where 6≤x≤8, b1+b2+b3+b4+b5=2, 0<b1<1, 0<b2<1, 0<b3<1, 0<b4<1, and 0<b5<1), $Li_xLa_3Zr_{b1}Hf_{b2}In_{b3}Nb_{b4}O_{12}$ (where 6≤x≤8, b1+b2+b3+b4=2, 0<b1<1, 0<b2<1, 0<b3<1, and 0<b4<1), $Li_xLa_3Zr_{b1}Hf_{b2}Sc_{b3}Nb_{b4}O_{12}$ (where 6≤x≤8, b1+b2+b3+b4=2, 0<b1<1, 0<b2<1, 0<b3<1, and 0<b4<1), $Li_xLa_3Zr_{b1}Hf_{b2}Sn_{b3}Ru_{b4}O_{12}$ (where 6≤x≤8, b1+b2+b3+b4=2, 0<b1<1, 0<b2<1, 0<b3<1, and 0<b4<1), $Li_xLa_{a1}Ba_{a2}Zr_{b1}Hf_{b2}In_{b3}Nb_{b4}Sn_{b5}O_{12}$ (where 6≤x≤8, a1+a2=3, b1+b2+b3+b4+b5=2, 0<a1<3, 0<a2<3, 0<b1<1, 0<b2<1, 0<b3<1, 0<b4<1, and 0<b5<1), $Li_xLa_{a1}Ba_{a2}Zr_{b1}Hf_{b2}Sc_{b3}Nb_{b4}Sn_{b5}O_{12}$ (where 6≤x≤8, a1+a2=3, b1+b2+b3+b4+b5=2, 0<a1<3, 0<a2<3, 0<b1<1, 0<b2<1, 0<b3<1, 0<b4<1, and 0<b5<1), $Li_xLa_3Zr_{b1}Hf_{b2}Sn_{b3}Sc_{b4}Nb_{b5}O_{12-z}F_z$ (where 6≤x≤8, b1+b2+b3+b4+b5=2, 0<b1<1, 0<b2<1, 0<b3<1, 0<b4<1, 0<b5<1, and 0≤z≤2), $Li_xLa_3Zr_{b1}Hf_{b2}Sn_{b3}Sc_{b4}Nb_{b5}O_{12-z}Cl_z$ (where 6≤x≤8, b1+b2+b3+b4+b5=2, 0≤z≤2, 0<b1<1, 0<b2<1, 0<b3<1, 0<b4<1, and 0<b5<1), or a combination thereof.

For example, the oxide according to an embodiment may be $Li_7La_3Zr_{0.4}Hf_{0.4}Sc_{0.4}Nb_{0.4}Sn_{0.4}O_{12}$, $Li_7La_3Zr_{0.3}Hf_{0.5}Sc_{0.3}Nb_{0.5}Sn_{0.4}O_{12}$, $Li_7La_3Zr_{0.5}Hf_{0.5}Sc_{0.5}Nb_{0.3}Sn_{0.4}O_{12}$, $Li_7La_3Zr_{0.3}Hf_{0.5}Sc_{0.4}Nb_{0.3}Sn_{0.5}O_{12}$, $Li_7La_3Zr_{0.5}Hf_{0.3}Sc_{0.4}Nb_{0.5}Sn_{0.3}O_{12}$, $Li_7La_3Zr_{0.5}Hf_{0.5}In_{0.5}Nb_{0.5}O_{12}$,
$Li_7La_3Zr_{0.4}Hf_{0.6}In_{0.4}Nb_{0.6}O_{12}$,
$Li_7La_3Zr_{0.6}Hf_{0.4}In_{0.6}Nb_{0.4}O_{12}$,
$Li_7La_3Zr_{0.4}Hf_{0.4}In_{0.6}Nb_{0.6}O_{12}$,
$Li_7La_3Zr_{0.6}Hf_{0.6}In_{0.4}Nb_{0.4}O_{12}$,
$Li_7La_3Zr_{0.5}Hf_{0.5}Sc_{0.5}Nb_{0.5}O_{12}$,
$Li_7La_3Zr_{0.4}Hf_{0.6}Sc_{0.4}Nb_{0.6}O_{12}$,
$Li_7La_3Zr_{0.6}Hf_{0.4}Sc_{0.6}Nb_{0.4}O_{12}$,
$Li_7La_3Zr_{0.4}Hf_{0.4}Sc_{0.6}Nb_{0.6}O_{12}$,
$Li_7La_3Zr_{0.6}Hf_{0.6}Sc_{0.4}Nb_{0.4}O_{12}$,
$Li_7La_3Zr_{0.5}Hf_{0.5}Sn_{0.5}Ru_{0.5}O_{12}$,
$Li_7La_3Zr_{0.4}Hf_{0.6}Sn_{0.4}Ru_{0.6}O_{12}$,
$Li_7La_3Zr_{0.6}Hf_{0.4}Sn_{0.6}Ru_{0.4}O_{12}$,
$Li_7La_3Zr_{0.4}Hf_{0.4}Sn_{0.6}Ru_{0.6}O_{12}$,
$Li_7La_3Zr_{0.6}Hf_{0.6}Sn_{0.4}Ru_{0.4}O_{12}$,
$Li_{7.1}La_{2.9}Ba_{0.1}Zr_{0.4}Hf_{0.4}In_{0.4}Nb_{0.4}Sn_{0.4}O_{12}$,
$Li_{7.1}La_{2.9}Ba_{0.1}Zr_{0.3}Hf_{0.5}In_{0.3}Nb_{0.5}Sn_{0.4}O_{12}$,
$Li_{7.1}La_{2.9}Ba_{0.1}Zr_{0.5}Hf_{0.3}In_{0.5}Nb_{0.3}Sn_{0.4}O_{12}$,
$Li_{7.1}La_{2.9}Ba_{0.1}Zr_{0.4}Hf_{0.4}Sc_{0.4}Nb_{0.4}Sn_{0.4}O_{12}$,
$Li_{7.1}La_{2.9}Ba_{0.1}Zr_{0.3}Hf_{0.5}Sc_{0.3}Nb_{0.5}Sn_{0.4}O_{12}$,
$Li_{7.1}La_{2.9}Ba_{0.1}Zr_{0.5}Hf_{0.3}Sc_{0.5}Nb_{0.3}Sn_{0.4}O_{12}$,
$Li_{7.1}La_{2.9}Ba_{0.1}Zr_{0.3}Hf_{0.5}Sc_{0.4}Nb_{0.3}Sn_{0.5}O_{12}$,
$Li_{7.1}La_{2.9}Ba_{0.1}Zr_{0.5}Hf_{0.3}Sc_{0.4}Nb_{0.5}Sn_{0.3}O_{12}$,
$Li_{6.8}La_3Zr_{0.4}Hf_{0.4}Sn_{0.4}Sc_{0.4}Nb_{0.4}O_{11.8}F_{0.2}$,
$Li_{6.8}La_3Zr_{0.3}Hf_{0.5}Sn_{0.3}Sc_{0.5}Nb_{0.4}O_{11.8}F_{0.2}$,
$Li_{6.8}La_3Zr_{0.5}Hf_{0.3}Sn_{0.5}Sc_{0.3}Nb_{0.4}O_{11.8}F_{0.2}$,
$Li_{6.8}La_3Zr_{0.3}Hf_{0.5}Sn_{0.4}Sc_{0.3}Nb_{0.5}O_{11.8}F_{0.2}$,
$Li_{6.8}La_3Zr_{0.5}Hf_{0.3}Sn_{0.4}Sc_{0.5}Nb_{0.3}O_{11.8}F_{0.2}$,
$Li_7La_3Zr_{0.4}Hf_{0.4}Al_{0.4}Nb_{0.4}Sn_{0.4}O_{12}$,
$Li_{7.0}La_{2.9}Y_{0.1}Zr_{0.4}Hf_{0.4}Sc_{0.4}Nb_{0.4}Sn_{0.4}O_{12}$,
$Li_7La_3Zr_{0.5}Hf_{0.5}Al_{0.5}Nb_{0.5}O_{12}$,
$Li_{6.8}La_3Zr_{0.4}Hf_{0.4}Sn_{0.4}Sc_{0.4}Nb_{0.4}O_{11.8}Cl_{0.2}$, or a combination thereof.

The number of elements located in a specific site of a garnet structure in the oxide may be confirmed through an X-ray diffraction (XRD) analysis, an inductively coupled plasma (ICP) analysis, and/or a neutron diffraction analysis.

In some embodiments, a singlet peak determined by X-ray diffraction (XRD) analysis of the oxide appears at a diffraction angle 2θ in a range of about 16° to about 20° or, for example, about 16° to about 17.5° and/or about 19° to about 20°. From the presence of the singlet peak, it may be known that the oxide has a garnet or garnet-like crystal structure, including a cubic phase.

In an embodiment, an ionic conductivity at room temperature (25° C.) of the lithium conductor comprising the oxide of Formula 1 may be at least about $1.0 \times 10^{-4}$ S/cm or, for example, at least about $2.0 \times 10^{-4}$ S/cm, at least about $2.73 \times 10^{-4}$ S/cm, or at least about $3.78 \times 10^{-4}$ S/cm, or about $3.78 \times 10^{-4}$ S/cm to about $1 \times 10^{-1}$ S/cm. For example, the ion conductivity of the lithium conductor may be about $1 \times 10^{-4}$ S/cm to about $1 \times 10^{-1}$ S/cm, about $2 \times 10^{-4}$ S/cm to about $1 \times 10^{-1}$ S/cm, about $2 \times 10^{-4}$ S/cm to about $9 \times 10^{-2}$ S/cm, about $4 \times 10^{-4}$ S/cm to about $9 \times 10^{-2}$ S/cm, about $4 \times 10^{-4}$ S/cm to about $5 \times 10^{-2}$ S/cm, about $5 \times 10^{-4}$ S/cm to about $2 \times 10^{-2}$ S/cm, about $6 \times 10^{-4}$ S/cm to about $1 \times 10^{-2}$ S/cm, about $7 \times 10^{-4}$ S/cm to about $9 \times 10^{-3}$ S/cm, about $8 \times 10^{-4}$ S/cm to about $8 \times 10^{-3}$ S/cm, about $9 \times 10^{-4}$ S/cm to about $7 \times 10^{-3}$ S/cm, about $1 \times 10^{-3}$ S/cm to about $7 \times 10^{-3}$ S/cm, about $5 \times 10^{-3}$ S/cm to about $8 \times 10^{-3}$ S/cm, or about $1 \times 10^{-3}$ S/cm to about $5 \times 10^{-3}$ S/cm. Ionic conductivity may be determined by a complex impedance method at 20° C., further details of which can be found in J.-M. Winand et al., "Measurement of Ionic Conductivity in Solid Electrolytes," Europhysics Letters, vol. 8, no. 5, p. 447-452, 1989. Without wishing to be bound by theory, it is understood that because the solid electrolyte has such high ion conductivity, the internal resistance of a lithium air battery containing the solid electrolyte is reduced.

When the oxide has such a high room-temperature ionic conductivity, an internal resistance of an electrochemical battery including the oxide may further decrease.

Because the oxide has a high room-temperature ionic conductivity, the oxide may be used as a solid electrolyte. The solid electrolyte may be used as a solid electrolyte of an electrochemical battery or, for example, a solid electrolyte of a lithium secondary battery or an all-solid battery.

The oxide according to an embodiment may be used as an electrode additive. The oxide according to an embodiment may be, for example, electrochemically stable at a voltage in a range of about 2.0 V to about 4.0 V with respect to a lithium metal.

The oxide may be in the form of particles. An average particle diameter of the particles may be, for example, in a range of about 5 nanometers (nm) to about 500 micrometers (μm) or, for example, about 100 nm to about 100 μm or about 1 μm to about 50 μm; and a specific surface area of the particles may be in a range of about 0.01 m²/g to about 1000 m²/g or, for example, about 0.5 m²/g to about 100 m²/g. Specific surface area may be determined as described in E. P. Barrett, L. G. Joyner, P. P. Halenda, "The determination of pore volume and area distributions in porous substances. I. Computations from nitrogen isotherms," J. Am. Chem. Soc. (1951), 73, 373-380, the content of which is incorporated herein by reference in its entirety.

Hereinafter, a method of preparing the oxide according to an embodiment will be described.

For example, a method of preparing an oxide may be explained by using, for example, a solid-state method, but other methods such as a spark plasma sintering method other than the solid state method may be used as the method of preparing an oxide, and the method is not limited to the solid state method.

Precursors for forming the oxide according to an embodiment may be mixed to prepare a precursor mixture, and the precursor mixture may be heat-treated.

A precursor mixture for preparing the oxide is provided. The precursor mixture may be prepared, previously prepared, or purchased.

During the preparation of the precursor mixture, metal precursors having a combination of at least four elements may be used. The precursor mixture may include at least one of an M1 precursor, an M2 precursor, and an M3 precursor, to obtain the oxide of Formula 1.

In Formula 1, when y is 0, the precursor mixture may be obtained by mixing a lithium precursor, an M2 precursor, and an M3 precursor. In Formula 1, when z is not 0, an X-containing lithium precursor may further be added to the precursor mixture. Examples of the X-containing lithium precursor may include LiCl or LiF.

The precursor mixture may mixed by using a suitable method such as milling, blending, or sputtering. Examples of the milling may include ball milling, airjet milling, bead milling, roll milling, or planetary milling.

When the precursor mixture is prepared, for example, the mixing may be performed by undergoing a process of milling the precursors for forming the oxide.

In the precursor mixture, any suitable material that may dissolve or disperse the lithium precursor, M1 precursor, M2 precursor, and M3 precursor may be used. Examples of a solvent may include acetone, ethanol, water, ethylene glycol, isopropanol, or a combination thereof. An amount of the solvent may be in a range of about 50 parts by weight to about 1,000 parts by weight or, for example, about 100 parts by weight to about 300 parts by weight, based on the total weight of 100 parts by weight of the precursor compound.

The lithium precursor may be, for example, at least one selected from a lithium oxide, a lithium carbonate, a lithium chloride, a lithium sulfate, a lithium nitrate, a lithium phosphate, a lithium hydroxide.

Each of the M1 precursor, M2 precursor, or M3 precursor may be, for example, at least one selected from a hydroxide, a carbonate, a sulfate, a nitride, an oxide, a phosphate, and a nitrate respectively containing M1, M2, or M3.

When the M2 precursor is a lanthanum precursor, examples of the lanthanum precursor may include a lanthanum oxide and a lanthanum sulfate. When the M2 precursor is a barium precursor, examples of the barium precursor may include a barium oxide, a barium hydroxide, and a barium chloride.

When the M3 precursor is a zirconium precursor, examples of the zirconium precursor may include a zirconium oxide, a zirconium sulfate, a zirconium carbonate, and a zirconium hydroxide. Also, when the M3 precursor is a hafnium precursor, examples of the hafnium precursor may include a hafnium oxide, a hafnium sulfate, a hafnium carbonate, and a hafnium hydroxide.

Examples of the M3 precursor may include a tungsten oxide, a tungsten carbonate, a tungsten chloride, a tellurium oxide, a tellurium hydroxide, a tellurium chloride, a selenium oxide, a selenium hydroxide, a selenium chloride, a niobium oxide, a niobium hydroxide, a niobium chloride, an indium oxide, an indium chloride, an indium hydroxide, an indium sulfate, a tin oxide, a tin chloride, a tin hydroxide, a scandium oxide, a ruthenium oxide, a ruthenium chloride, or a combination thereof.

The amounts of the lithium precursor, M1, precursor, M2 precursor, and M3 precursor may be stoichiometrically selected such that an oxide represented by Formula 1 may be obtained.

The heat-treating of the precursor mixture may be performed at a temperature in a range of about 600° C. to about 1100° C., or about 700° C. to about 1000° C. and may be performed, for example, for about 1 hour to about 48 hours, about 1 hour to about 30 hours, about 2 hours to about 15 hours or about 5 hours to about 12 hours.

When the heat-treating is performed within these temperature and time ranges, an oxide having the desired crystal structure may be obtained.

Subsequently, a molded product may be obtained from the oxide. The molded product is, for example, in the form of powder particles. A size of the molded product (powder particles), obtained by pulverization, may be about 10 μm or less. When the pulverized particle size is within this range, the particle size is small enough so that pulverizing and mixing of the particles may be sufficiently performed, which may facilitate formation of a crystal phase.

As used herein, the term "size" may denote an average diameter when a particle has a spherical shape and may denote a longitudinal length when the particle does not have a spherical shape. The size may be measured by using an electron scanning microscope or a particle size analyzer.

An additional heat-treatment may be performed on the molded product. A temperature increase rate of the heat-treatment may be in a range of about 1° C./min to about 10° C./min. Additional heat-treating, for example, a secondary heat-treating may be performed at a temperature in a range of about 900° C. to about 1500° C. or, for example, about 1000° C. to about 1200° C. A heat-treating temperature ($T_2$) of the molded product may be higher than the heat-treating temperature ($T_1$) of the heat-treatment of the precursor mixture.

As described above, when the heat-treating is performed at a high temperature, an oxide resulting therefrom may have a high density.

In an embodiment, a pressure may be applied to the molded product before the heat-treating of the molded product as described above. For example, the molded product may be prepared in a pellet form by performing a uniaxial pressuring process to the molded product. When the heat-treating of the molded product in the pellet form is performed, a distance for diffusing a material to be heat-treated is shortened, and thus the desired oxide may be prepared. When the heat-treatment is carried out on powder particle, i.e. not in the pellet form, the oxide may be made but a longer heat-treating time and a higher temperature may be used, because the diffusion distance is increased in the powder particle compared to the diffusion distance in the pellet form.

Also, the heat-treating may be performed by covering the heat-treated molded product with a heat-treated oxide powder. For example, the powder may cover the top of a pellet. When the oxide is heat-treated in this manner, volatilizing of lithium from the pellet or changing of the composition may be prevented.

The heat-treating of the molded product and the pellet may be performed, for example, in an oxidizing gas atmosphere, a reducing gas atmosphere, or an inert gas atmosphere. The oxidizing gaseous atmosphere may be prepared by using, for example, air or oxygen; and the reducing gas atmosphere may be prepared by using, for example, a reducing gas such as hydrogen and an inert gas such as nitrogen, argon, or helium.

The heat-treating time of the molded product and pellet may change depending on the heat-treating temperature and may be in a range of about 1 hour to about 50 hours or, for example, about 2 hours to about 10 hours.

Also, according to another aspect of an embodiment, an electrochemical device includes the oxide. The electrochemical device may be an electrochemical battery, an accumulator, a super capacitor, a fuel cell, a sensor, or a discoloration element.

According to an aspect, a solid electrolyte includes the oxide. According to an aspect, a solid electrolyte includes a binder and the oxide.

According to another aspect, an electrochemical battery includes a cathode; an anode; and a solid electrolyte that is disposed between the cathode and the anode and includes the oxide.

The electrochemical battery may include a cathode; an anode including lithium; and a solid electrolyte that is disposed between the cathode and the anode and includes the oxide.

The electrochemical battery may be a lithium secondary battery, a lithium air battery, or an all-solid battery. Also, the electrochemical battery may be used in both a primary battery and a secondary battery. A shape of the electrochemical battery is not particularly limited, and examples of the shape may include a coin, a button, a sheet, a stack, a cylinder, a plate, and a cone. The electrochemical battery according to an embodiment may be applied to a medium-to-large sized battery for electric vehicles.

The electrochemical battery may be, for example, an all-solid battery including a general anode active material or an all-solid battery using a precipitation anode.

The precipitation anode denotes an anode that has an anode-free coating layer free of an anode active material when an electrochemical battery is assembled, but on which an anode material such as lithium metal precipitates after charging the electrochemical battery.

The solid electrolyte may be in the form of a protective layer, wherein the protective layer is on the cathode, the anode, or a combination thereof.

The solid electrolyte according to an embodiment may be used as a cathode protective layer in a battery using a sulfide-based solid electrolyte and may reduce reactions between the sulfide-based solid electrolyte and the cathode. Also, the solid electrolyte according to an embodiment may be used as a cathode coating material and thus a cathode protective layer. Also, the solid electrolyte has a high oxidation potential, which may be used as a cathode electrolyte or, for example, in an all-solid battery catholyte.

According to an embodiment, the electrochemical battery may be an all-solid battery.

Figure 4:
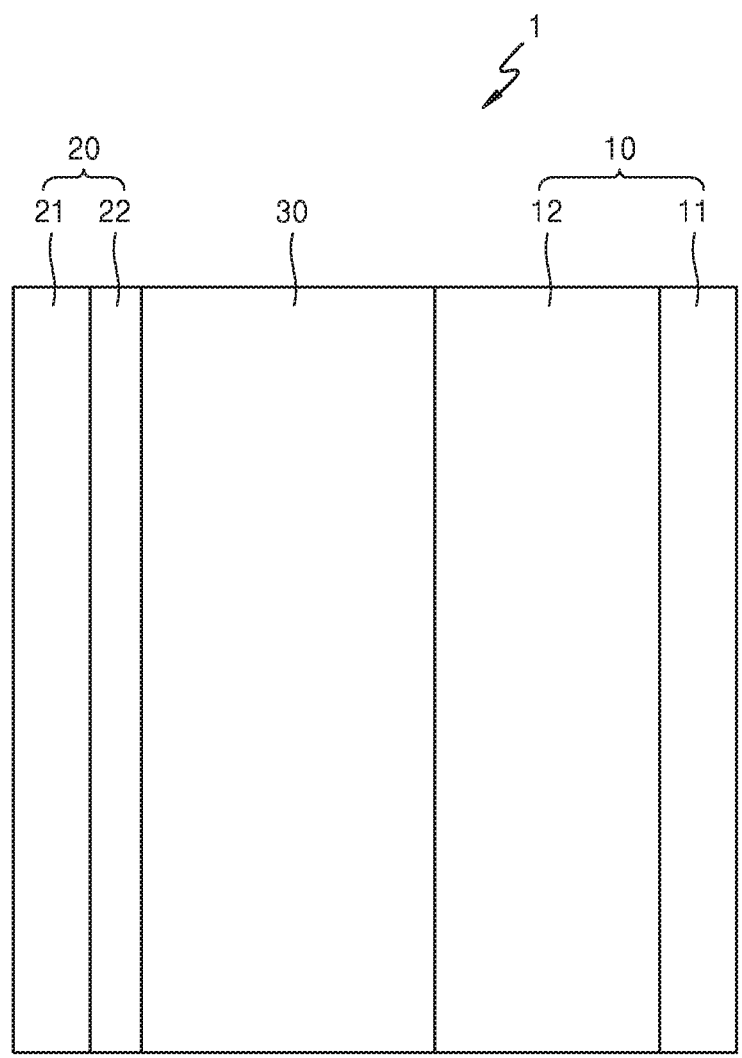
FIGS. 4 to 6 are each a cross-sectional view of an embodiment of a schematic structure of an all-solid battery.

A structure of an all-solid secondary battery 1 is shown in FIG. 4. The all-solid secondary battery 1 may include a cathode 10, an anode 20, and a solid electrolyte 30 containing the oxide.

The cathode 10 may include a cathode current collector 11 and a cathode active material layer 12. The cathode current collector 11 may be a plate, a plate body, or a foil body formed of, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The cathode current collector 11 may be omitted.

The cathode active material layer 12 may include a cathode active material and a solid electrolyte. Also, the solid electrolyte included in the cathode 10 may be similar to or different from a solid electrolyte included in the solid electrolyte 30.

The cathode active material may be a cathode active material capable of reversely intercalating and deintercalating lithium ions.

For example, the cathode active material may be formed by using lithium cobalt oxide (hereinafter, also referred to as "LCO"), lithium nickel oxide, lithium nickel cobalt oxide, lithium nickel cobalt aluminum oxide (hereinafter, also referred to as "NCA"), lithium nickel cobalt manganese oxide (hereinafter, also referred to as "NCM"), lithium manganate, lithium salts such as lithium iron phosphate, nickel sulfide, copper sulfide, lithium sulfide, iron oxide, or vanadium oxide. The examples of the cathode active material may be used alone or as a combination of at least two selected therefrom.

Also, the cathode active material may be, for example, a lithium salt of a ternary transition metal oxide expressed as $LiNi_xCo_yAl_zO_2$ (NCA) or $LiNi_xCo_yMn_zO_2$ (NCM) (where, $0<x<1$, $0<y<1$, $0<z<1$, and $x+y+z=1$).

The cathode active material may be covered by a coating layer. Here, the coating layer may be any material that may be used as a coating layer of a cathode active material of the all-solid secondary battery according to an embodiment. Examples of the coating layer may include $Li_2O$—$ZrO_2$.

Also, the cathode active material may be formed of a lithium salt of a ternary transition metal oxide such as NCA or NCM. The all-solid secondary battery 1 using cathode active material may have improved long-term stability and improved cycle characteristics.

Here, a shape of the cathode active material may be, for example, a particle shape such as a true spherical shape or an elliptical shape. Also, a particle diameter of the cathode active material is not particularly limited but may be in a range applicable to a cathode active material of an all-solid secondary battery. Further, an amount of the cathode active material of the cathode 10 is not particularly limited and may be in a suitable range for a cathode of an all-solid secondary battery.

Moreover, additives such as a conducting agent, a binder, a filler, a dispersant, and an ion conducting agent may be added to the cathode 10 at an appropriate ratio, in addition to the cathode active material, and the solid electrolyte.

Examples of the conducting agent that may be added to the cathode 10 may include graphite, carbon black, acetylene black, ketjen black, carbon fibers, and metal powder. Also, examples of the binder that may be added to the cathode 10 may include styrene butadiene rubber (SBR), polytetrafluoroethylene, polyvinylidene fluoride, and polyethylene. Also, the filler, the dispersant, and the ion conducting agent that may be added to the cathode 10 may be materials that are suitable for use in an electrode of a solid secondary battery.

The anode 20 may include an anode current collector 21 and an anode-free coating layer 22. The anode-free coating layer 22 shown in FIG. 4 may be a suitable anode active material layer.

For example, the anode-free coating layer 22 may contain a semimetal such as silicon and carbon, and may have a structure in which conducting binders are arranged around the metal and carbon.

A thickness of the anode-free coating layer 22 may be in a range of about 1 μm to about 20 μm, or about 5 μm to about 15 μm. The anode current collector 21 may be formed of a material that does not react with lithium that is not forming an alloy or a compound with lithium. The anode current collector 21 may be formed of, for example, copper (Cu), stainless steel, titanium (Ti), iron (Fe), cobalt (Co), or nickel (Ni). The anode current collector 21 may be formed of any metal selected therefrom alone or may be formed of an alloy of at least two different metals or a coating material. The anode current collector 21 may be, for example, a plate-like type or a thin-film type.

Figure 5:
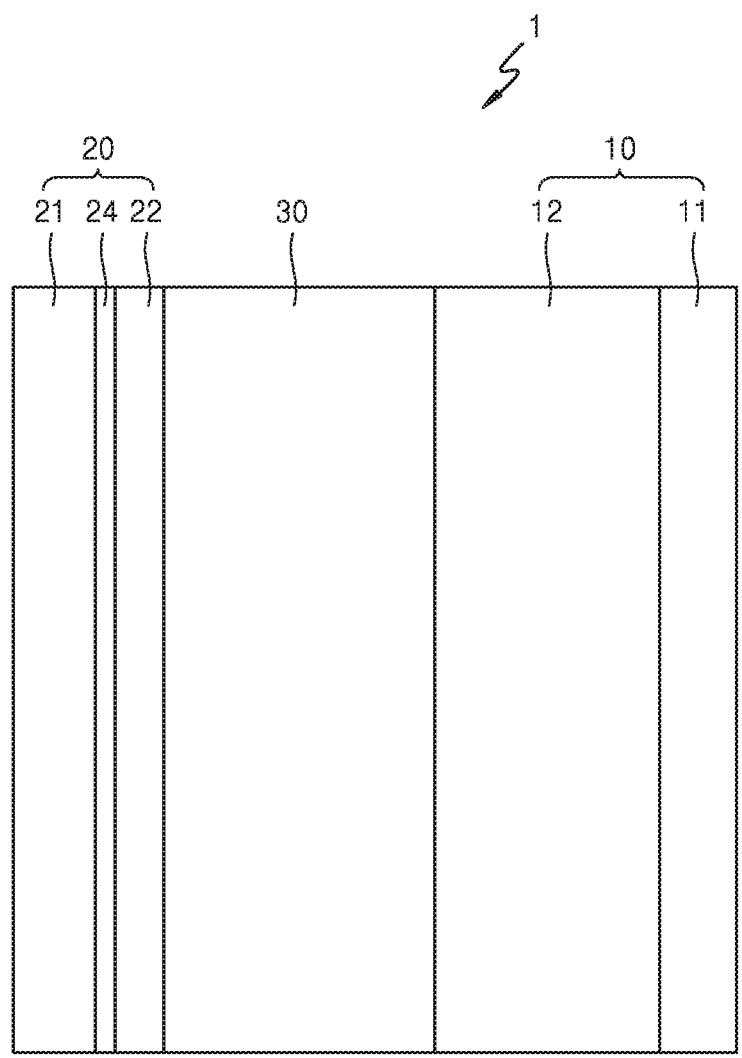
Figure 6:
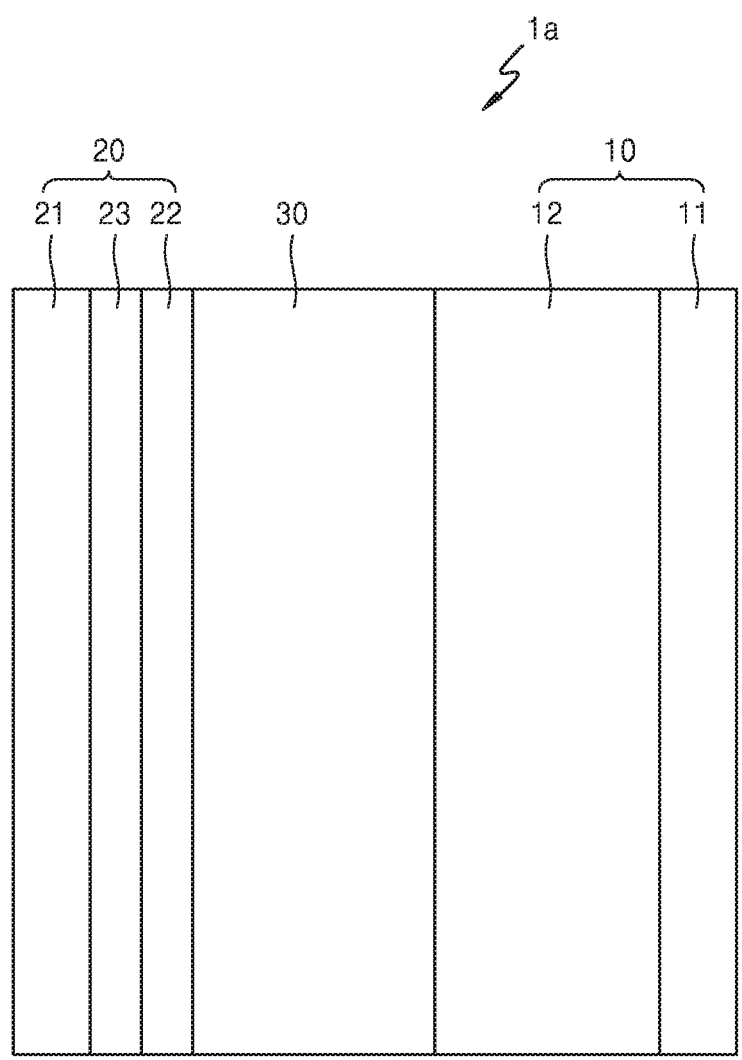

Here, as shown in FIG. 5, a thin layer 24 may be formed on a surface of the anode current collector 21. The thin layer 24 may include an element that may form an alloy of lithium. Examples of the element capable of forming an alloy of lithium may include gold, silver, zinc, tin, indium, silicon, aluminum, and bismuth. The thin layer 24 may be formed of a metal selected therefrom alone or various types of alloys. When the thin layer 24 exists, a metal layer 23 shown in FIG. 6 may be flat, and characteristics of the all-solid secondary battery 1 may further improve.

Here, a thickness of the thin layer 24 is not limited but may be in a range of about 1 nm to about 500 nm. When the thickness of the thin layer 24 is within this range, an amount of lithium precipitating from the anode 20 may be suitable to provide excellent characteristics of the all-solid secondary battery 1. The thin layer 24 may be formed on the anode current collector 21 by using, for example, vacuum vapor deposition, sputtering, or plating.

The anode-free coating layer 22 may include an anode active material that forms an alloy or a compound, together with lithium.

Examples of the anode active material may include amorphous carbon, gold (Au), platinum (Pt), palladium (Pd), silicon (Si), silver (Ag), aluminum (Al), bismuth (Bi), tin (Sn), or zinc (Zn). Here, examples of the amorphous carbon may include carbon black (CB), acetylene black (AB), furnace black (FB), ketjen black (KB), and graphene.

The anode-free coating layer 22 may include one of these anode active materials or at least two anode active materials selected therefrom. For example, the anode-free coating layer 22 may include only amorphous carbon as an anode active material or may include at least one metal such as gold, platinum, palladium, silicon, silver, aluminum, bismuth, tin, or zinc. Also, the anode-free coating layer 22 may include a mixture of amorphous carbon and at least one of gold, platinum, palladium, silicon, silver, aluminum, bismuth, tin, or zinc. A mixing weight ratio of amorphous carbon and at least one of gold, platinum, palladium, silicon, silver, aluminum, bismuth, tin, or zinc in the mixture may be, for example, in a range of about 10:1 to about 1:2. When the anode active material is formed of these materials, characteristics of the all-solid secondary battery 1 may improve.

Here, when the anode active material is at least one selected from gold, platinum, palladium, silicon, silver, aluminum, bismuth, tin, or zinc, a particle size (e.g., an average particle diameter) of the anode active material may be about 4 μm or less. In this case, characteristics of the all-solid secondary battery 1 may improve. Here, the particle diameter of the anode active material may be a median diameter (D50) measured by using, for example, a laser-type particle size distribution meter. In Examples and Comparative Examples, particle diameters were measured using this method. A lower limit of the particle diameter is not particularly limited but may be about 10 nm or less.

Also, the anode active material may include a mixture of first particles formed of amorphous carbon and second particles formed of a metal or a semi-metal. Examples of the metal or the semi-metal may include gold, platinum, palladium, silicon, silver, aluminum, bismuth, tin, or zinc. Here, an amount of the second particles may be in a range of about 8% by weight (wt %) to about 60 wt % or about 10 wt % to about 50 wt %, based on the total weight of the mixture. The characteristics of the all-solid secondary battery 1 including this anode active material may further improve.

A thickness of the anode-free coating layer 22 may be in a range of about 1 μm to about 20 μm. When the anode-free coating layer 22 is within this range, characteristics of the all-solid secondary battery 1 may sufficiently improve. When the binder is used, a thickness of the anode-free coating layer 22 may have an appropriate thickness.

In the anode-free coating layer 22, additives used in an all-solid battery such as a filler, a dispersant, and an ion conducting agent may be appropriately added.

The solid electrolyte may be a solid electrolyte including the oxide or may use an additional solid electrolyte in addition to the solid electrolyte including the oxide.

The additional solid electrolyte may be, for example, formed of a sulfide-based solid electrolyte material. Examples of the sulfide-based solid electrolyte material may include $Li_2S$—$P_2S_5$, $Li_2S$—$P_2S_5$—LiX (where X is a halogen, e.g., I or Cl), $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (where m and n are positive integers, and Z is Ge, Zn, or Ga), $Li_2S$—$GeS_2$, $Li_2S$—$SiS_2$—$Li_3PO_4$, or $Li_2S$—$SiS_2$—$Li_pMO_q$ (where p and q are positive integers, and M is P, Si, Ge, B, Al, Ga, or In). Here, the sulfide-based solid electrolyte material is prepared by melting and quenching starting materials (e.g., $Li_2S$ or $P_2S_5$), or mechanical milling the starting materials. Subsequently, the resultant may be heat-treated. The solid electrolyte may be amorphous or crystalline and may be a mixed form thereof.

Also, the solid electrolyte 30 may include sulfur (S), phosphorus (P), lithium (Li), or a combination thereof, as component elements in the sulfide-based solid electrolyte material, and, for example, $Li_2S$—$P_2S_5$ may be used as the solid electrolyte 30. Here, when $Li_2S$—$P_2S_5$ is used as a sulfide-based solid electrolyte material that forms the solid electrolyte 30, a molar ratio of $Li_2S$ and $P_2S_5$ ($Li_2S$:$P_2S_5$) may be, for example, selected in a range of about 50:50 to about 90:10. Also, the solid electrolyte layer 30 may further include a binder. The binder included in the solid electrolyte layer 30 may be styrene butadiene rubber (SBR), polytetrafluoroethylene, polyvinylidene fluoride, or polyethylene. The binder included in the solid electrolyte layer 30 may be the same with or different from the binder included in the cathode active material layer 12 and the anode-free coating layer 22.

One or more embodiments will now be described in more detail with reference to the following examples. However, these examples are not intended to limit the scope of the disclosed embodiments.

EXAMPLES

Preparation of Oxide

Example 1

$Li_2O$ as a lithium precursor, $La_2O_3$ as a lanthanum precursor, $ZrO_2$ as a zirconium precursor, $HfO_2$ as a hafnium precursor, $Sc_2O_3$ as a scandium precursor, $Nb_2O_5$ as a niobium precursor, and $SnO_2$ as a tin precursor were mixed at a stoichiometric ratio according to a composition ratio of the oxide shown in Table 1. The precursors were mixed by using a planetary mill (Pulverisette 7 premium line) with zirconia balls for 10 minutes and rested for 5 minutes. These milling and resting processes were repeated 12 times to obtain a precursor mixture.

The precursor mixture was put into an alumina furnace and primary heat-treated at a temperature of about 1000° C. with a temperature increasing at a rate of about 5° C./min for 12 hours to obtain an oxide.

TABLE 1

| Sample | Composition |
| --- | --- |
| Example 1 | $Li_7La_3Zr_{0.4}Hf_{0.4}Sc_{0.4}Nb_{0.4}Sn_{0.4}O_{12}$ |
| Example 2 | $Li_7La_3Zr_{0.5}Hf_{0.5}In_{0.5}Nb_{0.5}O_{12}$ |
| Example 3 | $Li_7La_3Zr_{0.5}Hf_{0.5}Sc_{0.5}Nb_{0.5}O_{12}$ |
| Example 4 | $Li_7La_3Zr_{0.5}Hf_{0.5}Sn_{0.5}Ru_{0.5}O_{12}$ |
| Example 5 | $Li_{7.1}La_{2.9}Ba_{0.1}Zr_{0.4}Hf_{0.4}In_{0.4}Nb_{0.4}Sn_{0.4}O_{12}$ |
| Example 6 | $Li_{7.1}La_{2.9}Ba_{0.1}Zr_{0.4}Hf_{0.4}Sc_{0.4}Nb_{0.4}Sn_{0.4}O_{12}$ |
| Example 7 | $Li_{6.8}La_3Zr_{0.4}Hf_{0.4}Sn_{0.4}Sc_{0.4}Nb_{0.4}O_{11.8}F_{0.2}$ |
| Comparative Example 1 | $Li_7La_3Hf_2O_{12}$ |
| Comparative Example 2 | $Li_7La_3Zr_{2/3}Hf_{2/3}Sn_{2/3}O_{12}$ |

Example 2

An oxide was prepared in the same manner as in Example 1, except that a mixture of $Li_2O$, $La_2O_3$, $ZrO_2$, $HfO_2$, $In_2O_3$, and $Nb_2O_5$ was used as a precursor mixture instead of the mixture of $Li_2O$, $La_2O_3$, $ZrO_2$, $HfO_2$, $Sc_2O_3$, $Nb_2O_5$, and $SnO_2$.

Example 3

An oxide was prepared in the same manner as in Example 1, except that a mixture of $Li_2O$, $La_2O_3$, $ZrO_2$, $HfO_2$, $Sc_2O_3$, and $Nb_2O_5$ was used as a precursor mixture instead of the mixture of $Li_2O$, $La_2O_3$, $ZrO_2$, $HfO_2$, $Sc_2O_3$, $Nb_2O_5$, and $SnO_2$.

Example 4

An oxide was prepared in the same manner as in Example 1, except that a mixture of $Li_2O$, $La_2O_3$, $ZrO_2$, $HfO_2$, $Sn_2O_3$, and $RuO_2$ was used as a precursor mixture instead of the mixture of $Li_2O$, $La_2O_3$, $ZrO_2$, $HfO_2$, $Sc_2O_3$, $Nb_2O_5$, and $SnO_2$.

Example 5

An oxide was prepared in the same manner as in Example 1, except that a mixture of $Li_2O$, $BaO$, $La_2O_3$, $ZrO_2$, $HfO_2$, $In_2O_3$, $Nb_2O_5$, and $SnO_2$ was used as a precursor mixture instead of the mixture of $Li_2O$, $La_2O_3$, $ZrO_2$, $HfO_2$, $Sc_2O_3$, $Nb_2O_5$, and $SnO_2$.

Example 6

An oxide was prepared in the same manner as in Example 1, except that a mixture of $Li_2O$, $BaO$, $La_2O_3$, $ZrO_2$, $HfO_2$, $Sc_2O_3$, $Nb_2O_5$, and $SnO_2$ was used as a precursor mixture instead of the mixture of $Li_2O$, $La_2O_3$, $ZrO_2$, $HfO_2$, $Sc_2O_3$, $Nb_2O_5$, and $SnO_2$.

Example 7

An oxide was prepared in the same manner as in Example 1, except that a mixture of $Li_2O$, $La_2O_3$, $ZrO_2$, $HfO_2$, $Sc_2O_3$, $SnO_2$, $Nb_2O_5$, and LiF was used as a precursor mixture instead of the mixture of $Li_2O$, $La_2O_3$, $ZrO_2$, $HfO_2$, $Sc_2O_3$, $Nb_2O_5$, and $SnO_2$. The amounts of LiF were controlled according to a stoichiometric ratio of composition ratios in Table 1.

Examples 8-19

An oxide was prepared in the same manner as in Example 1, except that a molar mixing ratio of each of precursor was changed so that oxides having compositions shown in Table 2 were obtained.

TABLE 2

| Sample | Composition |
|---|---|
| Example 8 | $Li_7La_3Zr_{0.3}Hf_{0.5}Sc_{0.3}Nb_{0.5}Sn_{0.4}O_{12}$ |
| Example 9 | $Li_7La_3Zr_{0.4}Hf_{0.6}In_{0.4}Nb_{0.6}O_{12}$ |
| Example 10 | $Li_7La_3Zr_{0.4}Hf_{0.6}Sc_{0.4}Nb_{0.6}O_{12}$ |
| Example 11 | $Li_7La_3Zr_{0.4}Hf_{0.6}Sn_{0.4}Ru_{0.6}O_{12}$ |
| Example 12 | $Li_{7.1}La_{2.9}Ba_{0.1}Zr_{0.3}Hf_{0.5}In_{0.3}Nb_{0.5}Sn_{0.4}O_{12}$ |
| Example 13 | $Li_{7.1}La_{2.9}Ba_{0.1}Zr_{0.5}Hf_{0.3}In_{0.5}Nb_{0.3}Sn_{0.4}O_{12}$ |
| Example 14 | $Li_{7.1}La_{2.9}Ba_{0.1}Zr_{0.3}Hf_{0.5}Sc_{0.3}Nb_{0.5}Sn_{0.4}O_{12}$ |
| Example 15 | $Li_{6.8}La_3Zr_{0.3}Hf_{0.5}Sn_{0.3}Sc_{0.5}Nb_{0.4}O_{11.8}F_{0.2}$ |
| Example 16 | $Li_7La_3Zr_{0.4}Hf_{0.4}Al_{0.4}Nb_{0.4}Sn_{0.4}O_{12}$ |
| Example 17 | $Li_{7.0}La_{2.9}Y_{0.1}Zr_{0.4}Hf_{0.4}Sc_{0.4}Nb_{0.4}Sn_{0.4}O_{12}$ |
| Example 18 | $Li_7La_3Zr_{0.5}Hf_{0.5}Al_{0.5}Nb_{0.5}O_{12}$ |
| Example 19 | $Li_{6.8}La_3Zr_{0.4}Hf_{0.4}Sn_{0.4}Sc_{0.4}Nb_{0.4}O_{11.8}Cl_{0.2}$ |

Comparative Example 1

An oxide was prepared in the same manner as in Example 1, except that a mixture of $Li_2O$, $La_2O_3$, and $HfO_2$ was used as a precursor mixture instead of the mixture of $Li_2O$, $La_2O_3$, $ZrO_2$, $HfO_2$, $Sc_2O_3$, $Nb_2O_5$, and $SnO_2$.

Comparative Example 2

An oxide was prepared in the same manner as in Example 1, except that a mixture of $Li_2O$, $La_2O_3$, $ZrO_2$, $HfO_2$, and $SnO_2$ was used as a precursor mixture instead of the mixture of $Li_2O$, $La_2O_3$, $ZrO_2$, $HfO_2$, $Sc_2O_3$, $Nb_2O_5$, and $SnO_2$.

Comparative Example 3

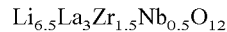

An oxide was prepared in the same manner as in Example 1, except that a mixture of $Li_2O$, $La_2O_3$, $ZrO_2$, and $Nb_2O_3$ was used as a precursor mixture instead of the mixture of $Li_2O$, $La_2O_3$, $ZrO_2$, $HfO_2$, $Sc_2O_3$, $Nb_2O_5$, and $SnO_2$.

The oxide according to Comparative Example 3 had a relatively reduced amount of lithium and thus exhibited reduced interfacial stability between the oxide and lithium metal when the oxide was disposed on the lithium metal.

Evaluation Example 1

X-Ray Diffraction (XRD) Analysis Spectrum

Figure 2A:
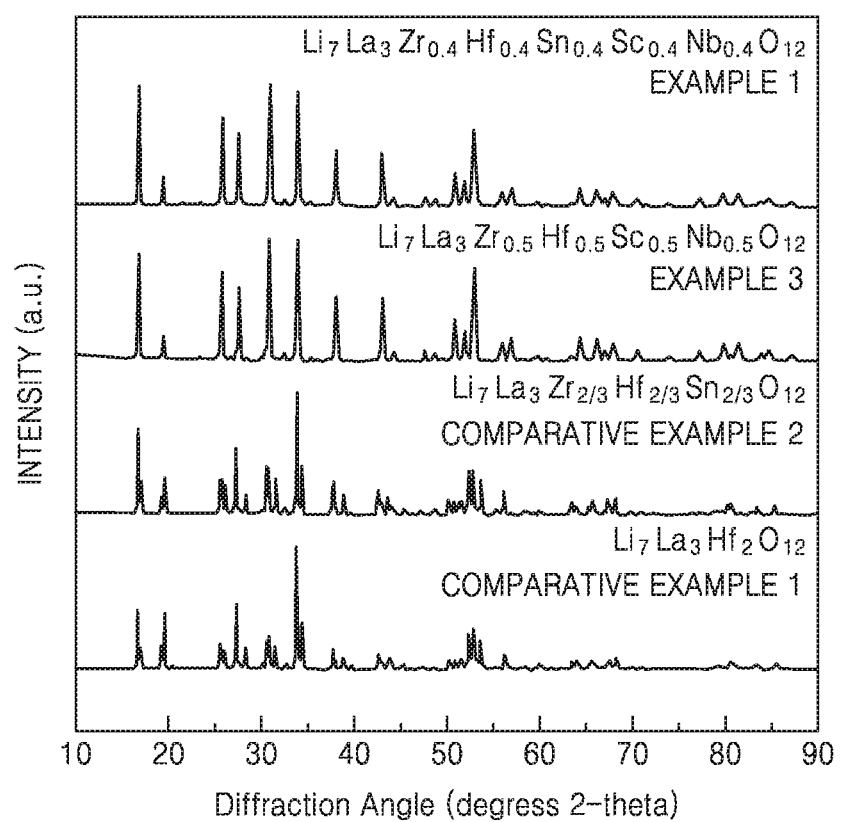
FIG. 2A is a graph of intensity (arbitrary units (a.u.)) versus diffraction angle (°2θ) and shows the results of X-ray diffraction analysis of oxides prepared in Example 1, Example 3, Comparative Example 1, and Comparative Example 2, when analyzed by X-ray diffraction (XRD) using Cu Kα radiation.
Figure 2B:
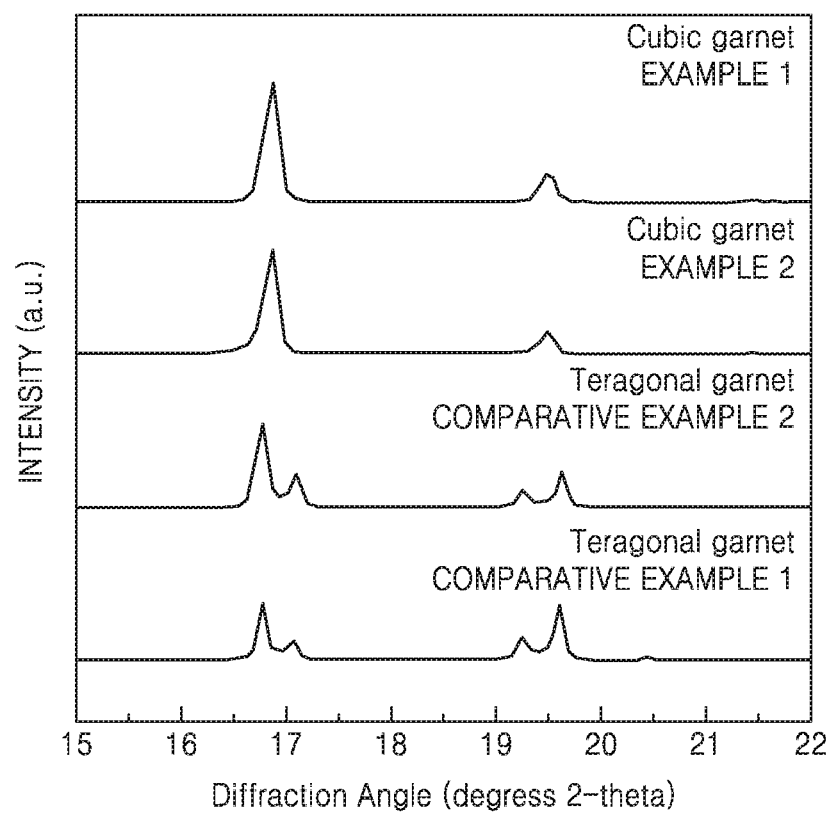
FIG. 2B shows a magnified view of a portion of FIG. 2A.

XRD spectra of the oxides prepared in Examples 1 and 3 and Comparative Examples 1 and 2 were obtained, and the results are shown in FIGS. 2A and 2B. FIG. 2B is a magnified view of a portion of FIG. 2A. The X-ray diffraction analysis was performed by using the D8 Advance available from Bruker, and Cu Kα radiation was used in the measurement of XRD spectrum.

Referring to FIG. 2A, it may be shown through the XRD pattern analysis that the oxides prepared in Examples 1 and 3 have a garnet crystal structure as well as the oxides of Comparative Examples 1 and 2 have, and by referring to FIG. 2B, it may be shown that the oxides of Examples 1 and 3 have a cubic phase.

As shown in FIG. 2B, the oxides of Examples 1 and 3 had a singlet peak at a diffraction angle 2θ in a range of about 16° to about 17.5°, which indicates that the oxides of Examples 1 and 3 had a garnet crystal structure including a cubic phase. In the oxides of Examples 1 and 3, configuration entropy is increased to stabilize the cubic phase. The cubic phase has an increased ionic conductivity.

Whereas, the oxides of Comparative Examples 1 and 2 had a multiplet peak as a splitting peak, determined by the XRD pattern analysis at a diffraction angle 2θ in a range of about 16° to about 17.5°, which indicates that, unlike the oxides of Examples 1 and 3, the oxides of Comparative Examples 1 and 2 had a garnet crystal structure including a tetragonal phase.

From the XRD analysis, it may be confirmed that the oxides of Examples 1 and 3 have a garnet structure containing a cubic phase that is stable at high temperatures based on an increase in configuration entropy.

Evaluation Example 2

Measurement of Ionic Conductivity and Activation Energy 1.5 g of each of the oxides prepared in Examples 1 to 7 and Comparative Examples 1 and 2 was put into a pellet having a diameter of 1 inch, and the oxide was pressed by using a uniaxial pressure to apply a weight of 5 ton for 2 minutes, and thus a pellet in the form of a circular disc was prepared. The pellet was put on a MgO single crystal, and the periphery of the pellet was covered with a primary heat-treated oxide powder to prevent lithium volatilization and composition change. Then, the pellet was heat-treated at a temperature of 1200° C. with the temperature increasing at a rate of 5° C./min for 4 hours.

The pellet obtained after the secondary heat-treating process was subjected to mirror polishing by using 1200/2000/4000/7000 grit sandpaper in sequence, and Au having a diameter of 8 mm was deposited by sputtering on two surfaces of the pellet by using a sputtering equipment to form Au electrodes, thereby completing preparation of an assembly including Au electrode/oxide pellet/Au electrode.

In the assembly including the Au electrode/oxide pellet/Au electrode, a wire was connected to each of the Au electrodes on both surfaces of the pellet, and an electron impedance spectroscopy (EIS) was used to perform an analysis. The EIS analysis was performed at an amplitude of about 10 millivolts (mV) and a frequency ranging from about 0.1 hertz (Hz) to about $10^6$ Hz.

The results of the EIS evaluation are shown in Table 3. A total resistance ($R_{total}$) value was obtained from the impedance result, and an electrode surface area and a pellet thickness were amended based on the total resistance value to calculate a conductivity value. Also, during the EIS measurement, an activation energy $E_a$ with respect to Li ion conduction, was calculated from the results measured by changing a temperature of a chamber loaded with each sample of the oxides. The conductivity values measured per temperature in a range of about 298 K to about 378 K were converted to Arrhenius plots using Equation 2 so that activation energy $E_a$ was calculated from a slope value determined from the Arrhenius plots.

$$\sigma T = A \exp(E_a/RT) \quad \text{Equation 2}$$

In Equation 2, $E_a$ denotes an activation energy, T denotes an absolute temperature, A denotes a pre-exponential factor, R denotes a gas constant, and σ denotes a conductivity.

The results of activation energy analysis obtained are shown in Table 3 and FIGS. 3A to 3D.

in a garnet composition $(Li_xM1_y)(M2)_3(M3)_2A_{12}$ is 1, where Hf is introduced to the composition. As a result of measuring ion conductivities, an ionic conductivity of $1.7 \times 10^{-6}$ S/cm (where the activation energy is $E_a$=459.5 millielectronvolts (meV)) at room temperature was confirmed. As well as in Comparative Example 2 when N=3, a configuration entropy was not sufficient to stabilize a cubic phase, and thus it was confirmed that the oxide of Comparative Example 1 has a tetragonal phase when N was 1, which result in a drastic decrease in an ionic conductivity.

Figure 3A:
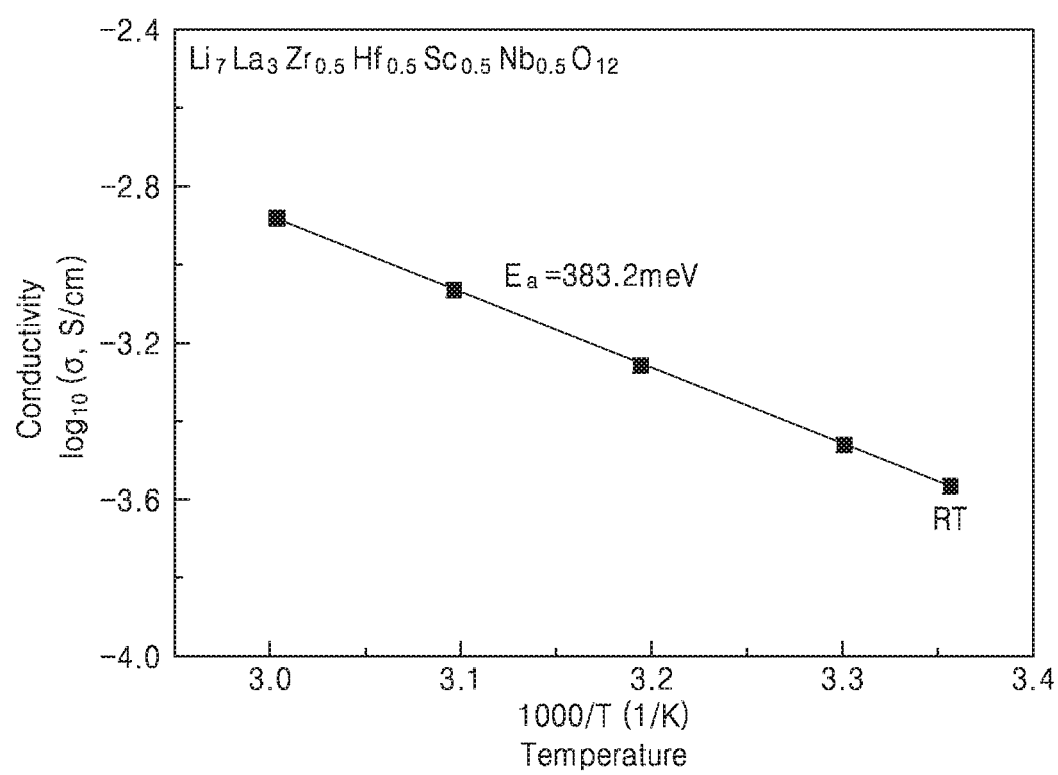
FIG. 3A is a graph of conductivity (log Siemens per centimeter (S/cm)) versus temperature (1000/Kelvin (K)) that shows the activation energy of the oxide prepared in Example 3.
Figure 3B:
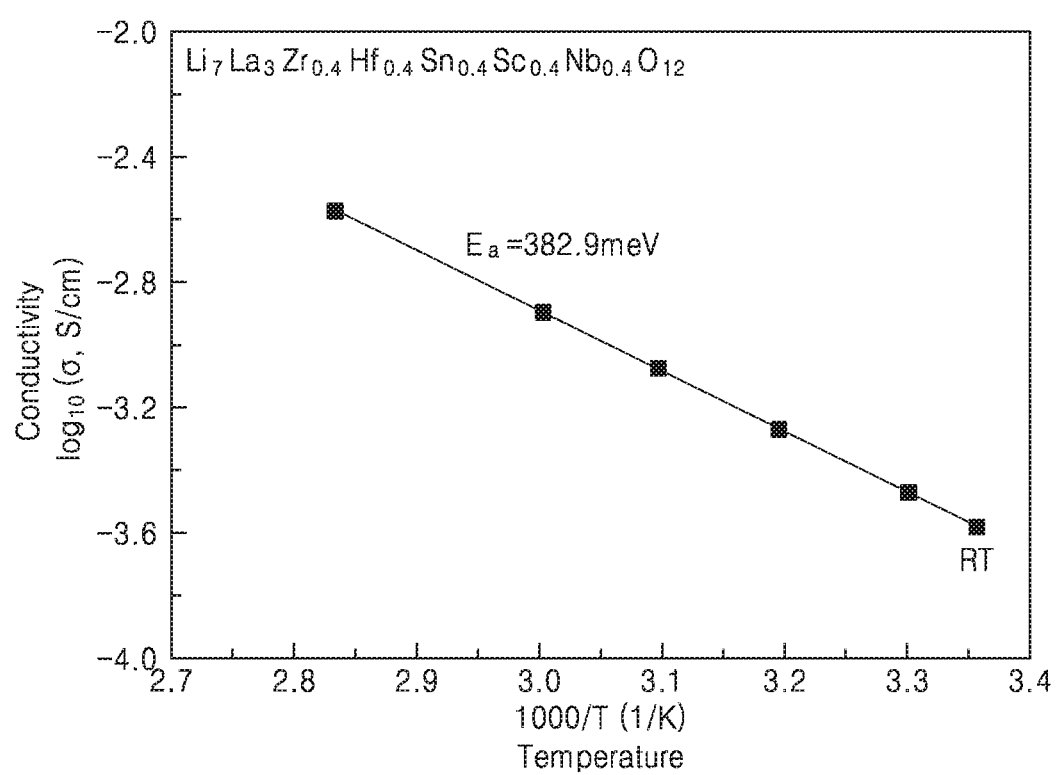
FIG. 3B is a graph of conductivity (log Siemens per centimeter (S/cm)) versus temperature (1000/Kelvin (K)) that shows the activation energy of the oxide prepared in Example 1.
Figure 3C:
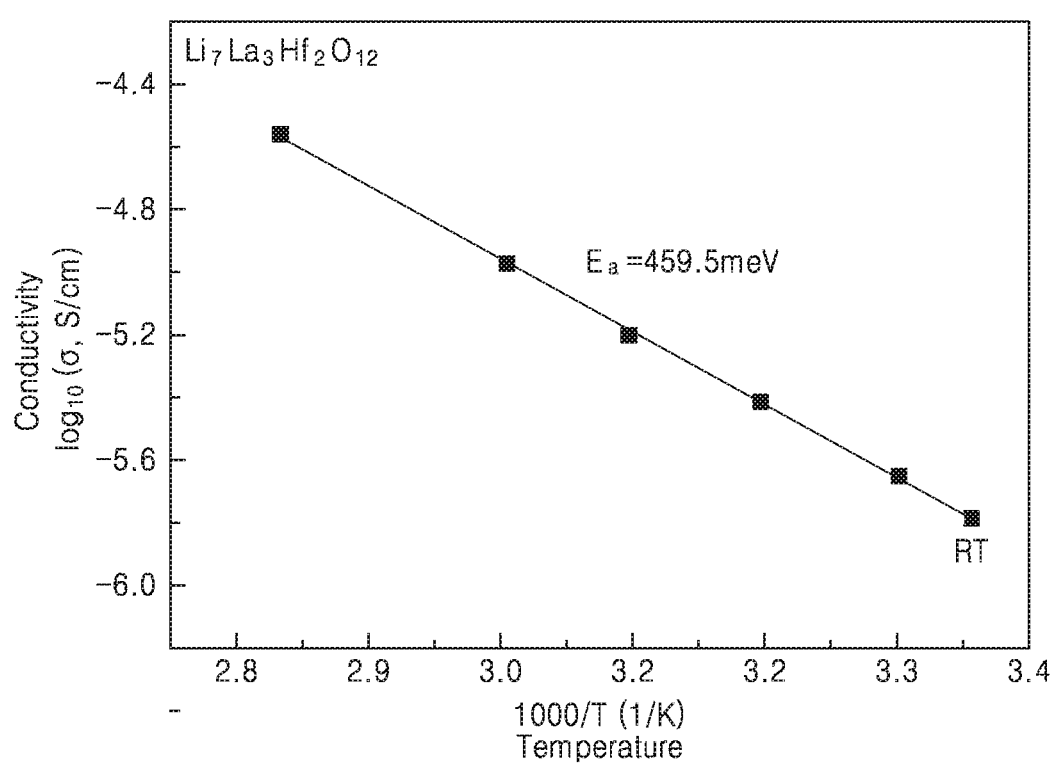
FIG. 3C is a graph of conductivity (log Siemens per centimeter (S/cm)) versus temperature (1000/Kelvin (K)) that shows the activation energy of the oxide prepared in Comparative Example 1.
Figure 3D:
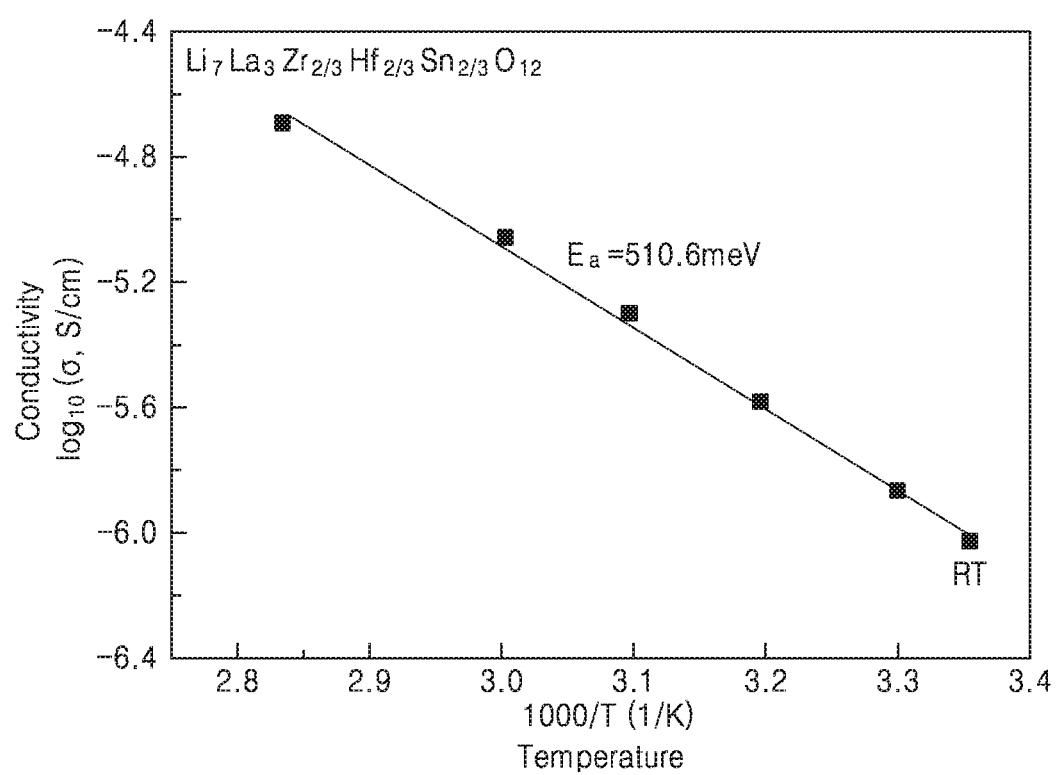
FIG. 3D is a graph of conductivity (log Siemens per centimeter (S/cm)) versus temperature (1000/Kelvin (K)) that shows the activation energy of the oxide prepared in Comparative Example 2.

Referring to FIG. 3D, the oxide of Comparative Example 2 is the case when the number of elements N located at the M3 site in a garnet composition, $(Li_xM1_y)(M2)_3(M3)_2A_{12}$, is 3, where Zr, Hf, and Sn are introduced in the composition. As shown in FIG. 3D, it was confirmed that the oxide of Comparative Example 2 had an ionic conductivity of $1.7 \times 10^{-6}$ S/cm (where the activation energy is $E_a$=510.6 meV) at room temperature. When N was smaller than 4, a configuration entropy was not sufficient to stabilize a cubic phase and thus it was confirmed that the oxide has a tetragonal phase, which results a rapid decrease in an ionic conductivity.

Also, ion conductivities and activation energies of the oxides of Examples 8 to 15 were analyzed in the same manner as the ion conductivities and activation energies of the oxides of Examples 1 to 7 were measured.

As a result of the analysis, the oxides of Examples 8 to 19 each had similar ion conductivities and activation energies as the oxides of Examples 1 to 7, respectively.

Evaluation Example 3

Inductively Coupled Plasma Analysis

Inductively coupled plasma analysis was performed on the oxides prepared according to Examples 1, 3, and 4, and the results of the analysis are shown in Table 4.

ICPS-8100 available from SHIMADZU was used to perform the inductively coupled plasma analysis.

TABLE 3

| Sample | Composition | σ(S/cm) @25° C. | Ea (meV) |
|---|---|---|---|
| Example 1 | $Li_7La_3Zr_{0.4}Hf_{0.4}Sc_{0.4}Nb_{0.4}Sn_{0.4}O_{12}$ | $2.6 \times 10^{-4}$ | 382.9 |
| Example 2 | $Li_7La_3Zr_{0.5}Hf_{0.5}In_{0.5}Nb_{0.5}O_{12}$ | $1.27 \times 10^{-4}$ | |
| Example 3 | $Li_7La_3Zr_{0.5}Hf_{0.5}Sc_{0.5}Nb_{0.5}O_{12}$ | $2.73 \times 10^{-4}$ | 383.2- |
| Example 4 | $Li_7La_3Zr_{0.5}Hf_{0.5}Sn_{0.5}Ru_{0.5}O_{12}$ | $3.78 \times 10^{-4}$ | — |
| Example 5 | $Li_{7.1}La_{2.9}Ba_{0.1}Zr_{0.4}Hf_{0.4}In_{0.4}Nb_{0.4}Sn_{0.4}O_{12}$ | $2.00 \times 10^{-4}$ | — |
| Example 6 | $Li_{7.1}La_{2.9}Ba_{0.1}Zr_{0.4}Hf_{0.4}Sc_{0.4}Nb_{0.4}Sn_{0.4}O_{12}$ | $1.94 \times 10^{-4}$ | — |
| Example 7 | $Li_{6.8}La_3Zr_{0.4}Hf_{0.4}Sn_{0.4}Sc_{0.4}Nb_{0.4}O_{11.8}F_{0.2}$ | $2.31 \times 10^{-4}$ | — |
| Comparative Example 1 | $Li_7La_3Hf_2O_{12}$ | $1.70 \times 10^{-6}$ | 459.5 |
| Comparative Example 2 | $Li_7La_3Zr_{2/3}Hf_{2/3}Sn_{2/3}O_{12}$ | $9.5 \times 10^{-7}$ | 510.6 |

As shown in Table 3, it may be known that the oxides prepared in Examples 1 to 7 have improved ionic conductivity at room temperature (25° C.) compared to those of the oxides prepared in Comparative Examples 1 and 2.

Also, as shown in Table 3 and FIGS. 3A to 3D, the oxides of Examples 1 and 2 had smaller values compared to the activation energies of the oxides of Comparative Examples 1 and 2 (FIGS. 3C and 3D). When the activation energy of the oxide decreases as such, the ionic conductivity at low temperature may improve as a result.

Referring to FIG. 3C, in the oxide of Comparative Example 1, the number of elements N located at the M3 site Referring to the Inductively coupled plasma analysis, compositions of each element of the oxides prepared in Examples 1 to 3 was confirmed.

As described above, according to one or more embodiments, the oxide may have excellent lithium metal stability and has improved ionic conductivity. When the oxide is used, an electrochemical device with improved performance may be prepared.

It should be understood that embodiments described herein should be considered in a descriptive sense only and not for purposes of limitation. Descriptions of features, aspects, or advantages within each embodiment should be considered as available for other similar features, aspects, or advantages in other embodiments. While one or more embodiments have been described with reference to the figures, it will be understood by those of ordinary skill in the art that various changes in form and details may be made therein without departing from the spirit and scope as defined by the following claims.

What is claimed is:

1. An oxide comprising a compound represented by Formula 1:

$$(Li_xM1_y)(M2)_{3-\delta}(M3)_{2-\omega}O_{12-z}X_z \quad \text{Formula 1}$$

wherein, in Formula 1,
$6 \leq x \leq 8$, $0 \leq y < 2$, $-0.2 \leq \delta \leq 0.2$, $-0.2 \leq \omega \leq 0.2$, and $0 \leq z \leq 2$;
M1 is a monovalent cation, a divalent cation, a trivalent cation, or a combination thereof;
M2 is a monovalent cation, a divalent cation, a trivalent cation, or a combination thereof;
M3 is a monovalent cation, a divalent cation, a trivalent cation, a tetravalent cation, a pentavalent cation, a hexavalent cation, or a combination thereof;
wherein M3 comprises at least four elements wherein the at least four elements of M3 occupy the M3 crystallographic site; and
X is a monovalent anion, a divalent anion, a trivalent anion, or a combination thereof.

2. The oxide of claim 1, wherein at least one of M1 and M2 comprises at least one element.

3. The oxide of claim 1, wherein at least one of M1 or M2 comprises at least two elements.

4. The oxide of claim 1, wherein M3 comprises a combination of:
 four tetravalent cations;
 two tetravalent cations, one trivalent cation, and one pentavalent cation;
 two tetravalent cations, one divalent cation, and one hexavalent cation;
 three tetravalent cations, one trivalent cation, and one pentavalent cation;
 three tetravalent cations, one divalent cation, and one hexavalent cation;
 one tetravalent cation, two trivalent cations, and two pentavalent cations;
 four tetravalent cations, one trivalent cation, and one pentavalent cation;
 four tetravalent cations, one divalent cation, and one hexavalent cation;
 two tetravalent cations, two trivalent cations, and two pentavalent cations; or
 two tetravalent cations, two divalent cations, and two hexavalent cations.

5. The oxide of claim 1, wherein, in Formula 1, X is iodine, chlorine, bromine, fluorine, cyanide, cyanate, thiocyanate, azide, or a combination thereof.

6. The oxide of claim 1, wherein the oxide has a singlet peak at a diffraction angle of about 16° 2θ to about 20° 2θ, when analyzed by X-ray diffraction using Cu Kα radiation.

7. The oxide of claim 1, wherein the oxide has a garnet structure comprising a cubic phase.

8. The oxide of claim 1, wherein a lithium ionic conductivity of the oxide is at least about $1 \times 10^{-4}$ siemens per centimeter at 25° C.

9. The oxide of claim 1, wherein the compound represented by Formula 1 is a compound represented by Formula 2:

$$(Li_xM1_y)(La_{a1}M4_{a2})_{3-\delta}(M5_{b1}M6_{b2}M7_{b3}M8_{b4}M9_{b5})_{2-\omega}O_{12-z}X_z \quad \text{Formula 2}$$

wherein, in Formula 2,
M1 is hydrogen, iron, gallium, aluminum, boron, beryllium, or a combination thereof,
M4 is barium, calcium, strontium, yttrium, bismuth, praseodymium, neodymium, actinium, samarium, gadolinium, or a combination thereof, and
M5 to M9 are each independently zirconium, hafnium, tin, niobium, titanium, vanadium, chromium, manganese, cobalt, nickel, copper, molybdenum, tungsten, tantalum, magnesium, technetium, ruthenium, palladium, iridium, scandium, cadmium, indium, antimony, tellurium, thallium, platinum, silicon, aluminum, or a combination thereof;
$6 \leq x \leq 8$, $0 \leq y < 2$, $-0.2 \leq \delta \leq 0.2$, $-0.2 \leq \omega \leq 0.2$, and $0 \leq z \leq 2$;
$a1+a2=1$, $0 < a1 \leq 1$, and $0 \leq a2 < 1$;
$b1+b2+b3+b4+b5=1$, $0 < b1 < 1$, $0 < b2 < 1$, $0 < b3 < 1$, $0 < b4 < 1$, and $0 \leq b5 < 1$; and
X is a monovalent anion, a divalent anion, a trivalent anion, or a combination thereof, and M5 to M9 are different from each other.

10. The oxide of claim 1, wherein the compound represented by Formula 1 is a compound represented by Formula 3:

$$Li_x(La_{a1}M10_{a2})_{3-\delta}(M11_{b1}M12_{b2}M13_{b3}M14_{b4}M15_{b5})_{2-\omega}O_{12-z}X_z \quad \text{Formula 3}$$

wherein, in Formula 3,
M10 is barium, calcium, strontium, yttrium, bismuth, praseodymium, neodymium, actinium, samarium, gadolinium, or a combination thereof,
M11 is zirconium, hafnium, or a combination thereof, and
M12 to M15 are each independently zirconium, hafnium, tin, niobium, titanium, vanadium, chromium, manganese, cobalt, nickel, copper, molybdenum, tungsten, tantalum, magnesium, technetium, ruthenium, palladium, iridium, scandium, cadmium, indium, antimony, tellurium, thallium, platinum, silicon, aluminum, or a combination thereof;
$6 \leq x \leq 8$, $0.2 \leq \delta \leq 0.2$, $-0.2 \leq \omega \leq 0.2$, and $0 \leq z \leq 2$;
$a1+a2=1$, $0 < a1 \leq 1$, and $0 \leq a2 < 1$;
$b1+b2+b3+b4+b5=1$, $0 < b1 < 1$, $0 < b2 < 1$, $0 < b3 < 1$, $0 < b4 < 1$, and $0 < b5 < 1$; and
X is a monovalent anion, a divalent anion, a trivalent anion, or a combination thereof.

11. The oxide of claim 10, wherein, in Formula 3,
M10 is barium,
M11 is zirconium,
M12 is hafnium, and
M13 to M15 are each independently tin, niobium, titanium, vanadium, chromium, manganese, cobalt, nickel, copper, molybdenum, tungsten, tantalum, magnesium, technetium, ruthenium, palladium, iridium, scandium, cadmium, indium, antimony, tellurium, thallium, platinum, silicon, or a combination thereof; and
z is 0, or X is fluorine or chlorine.

12. The oxide of claim 11, wherein M13 to M15 are each independently tin, niobium, scandium, indium, or a combination thereof, and
z is 0, or X is fluorine or chlorine.

13. The oxide of claim 1, wherein, in Formula 1,
M2 is lanthanum, barium, or a combination thereof,
M3 comprises at least four elements selected from zirconium, hafnium, tin, niobium, scandium, or indium, and
z is 0, or X is fluorine.

14. The oxide of claim 1, wherein the oxide is
$Li_xLa_3Zr_{b1}Hf_{b2}Sc_{b3}Nb_{b4}Sn_{b5}O_{12}$ wherein $6 \le x \le 8$, b1+b2+b3+b4+b5=2, $0<b1<1$, $0<b2<1$, $0<b3<1$, $0<b4<1$, and $0<b5<1$,
$Li_xLa_3Zr_{b1}Hf_{b2}In_{b3}Nb_{b4}O_{12}$ wherein $6 \le x \le 8$, b1+b2+b3+b4=2, $0<b1<1$, $0<b2<1$, $0<b3<1$, and $0<b4<1$,
$Li_xLa_3Zr_{b1}Hf_{b2}Sc_{b3}Nb_{b4}O_{12}$ wherein $6 \le x \le 8$, b1+b2+b3+b4=2, $0<b1<1$, $0<b2<1$, $0<b3<1$, and $0<b4<1$,
$Li_xLa_3Zr_{b1}Hf_{b2}Sn_{b3}Ru_{b4}O_{12}$ wherein $6 \le x \le 8$, b1+b2+b3+b4=2, $0<b1<1$, $0<b2<1$, $0<b3<1$, and $0<b4<1$,
$Li_xLa_{a1}Ba_{a2}Zr_{b1}Hf_{b2}In_{b3}Nb_{b4}Sn_{b5}O_{12}$ wherein $6 \le x \le 8$, a1+a2=3, b1+b2+b3+b4+b5=2, $0<a1<3$, $0<a2<3$, $0<b1<1$, $0<b2<1$, $0<b3<1$, $0<b4<1$, and $0<b5<1$,
$Li_xLa_{a1}Ba_{a2}Zr_{b1}Hf_{b2}Sc_{b3}Nb_{b4}Sn_{b5}O_{12}$ wherein $6 \le x \le 8$, a1+a2=3, b1+b2+b3+b4+b5=2, $0<a1<3$, $0<a2<3$, $0<b1<1$, $0<b2<1$, $0<b3<1$, $0<b4<1$, and $0<b5<1$,
$Li_xLa_3Zr_{b1}Hf_{b2}Sn_{b3}Sc_{b4}Nb_{b5}O_{12-z}F_z$ wherein $6 \le x \le 8$, b1+b2+b3+b4+b5=2, $0<b1<1$, $0<b2<1$, $0<b3<1$, $0<b4<1$, $0<b5<1$, and $0 \le z \le 2$,
$Li_xLa_3Zr_{b1}Hf_{b2}Sn_{b3}Sc_{b4}Nb_{b5}O_{12-z}Cl_z$ wherein $6 \le x \le 8$, b1+b2+b3+b4+b5=2, $0 \le z \le 2$, $0<b1<1$, $0<b2<1$, $0<b3<1$, $0<b4<1$, and $0<b5<1$, or
a combination thereof.

15. The oxide of claim 1, wherein the oxide is
$Li_7La_3Zr_{0.4}Hf_{0.4}Sc_{0.4}Nb_{0.4}Sn_{0.4}O_{12}$,
$Li_7La_3Zr_{0.3}Hf_{0.5}Sc_{0.3}Nb_{0.5}Sn_{0.4}O_{12}$,
$Li_7La_3Zr_{0.5}Hf_{0.3}Sc_{0.5}Nb_{0.3}Sn_{0.4}O_{12}$,
$Li_7La_3Zr_{0.3}Hf_{0.5}Sc_{0.4}Nb_{0.3}Sn_{0.5}O_{12}$,
$Li_7La_3Zr_{0.5}Hf_{0.3}Sc_{0.4}Nb_{0.5}Sn_{0.3}O_{12}$,
$Li_7La_3Zr_{0.5}Hf_{0.5}In_{0.5}Nb_{0.5}O_{12}$,
$Li_7La_3Zr_{0.4}Hf_{0.6}In_{0.4}Nb_{0.6}O_{12}$,
$Li_7La_3Zr_{0.6}Hf_{0.4}In_{0.6}Nb_{0.4}O_{12}$,
$Li_7La_3Zr_{0.4}Hf_{0.4}In_{0.6}Nb_{0.6}O_{12}$,
$Li_7La_3Zr_{0.6}Hf_{0.6}In_{0.4}Nb_{0.4}O_{12}$,
$Li_7La_3Zr_{0.5}Hf_{0.5}Sc_{0.5}Nb_{0.5}O_{12}$,
$La_7La_3Zr_{0.4}Hf_{0.6}Sc_{0.4}Nb_{0.6}O_{12}$,
$Li_7La_3Zr_{0.6}Hf_{0.4}Sc_{0.6}Nb_{0.4}O_{12}$,
$Li_7La_3Zr_{0.4}Hf_{0.4}Sc_{0.6}Nb_{0.6}O_{12}$,
$Li_7La_3Zr_{0.6}Hf_{0.6}Sc_{0.4}Nb_{0.4}O_{12}$,
$Li_7La_3Zr_{0.5}Hf_{0.5}Sn_{0.5}Ru_{0.5}O_{12}$,
$Li_7La_3Zr_{0.4}Hf_{0.6}Sn_{0.4}Ru_{0.6}O_{12}$,
$Li_7La_3Zr_{0.6}Hf_{0.4}Sn_{0.6}Ru_{0.4}O_{12}$,
$Li_7La_3Zr_{0.4}Hf_{0.4}Sn_{0.6}Ru_{0.6}O_{12}$,
$Li_7La_3Zr_{0.6}Hf_{0.6}Sn_{0.4}Ru_{0.4}O_{12}$,
$Li_{7.1}La_{2.9}Ba_{0.1}Zr_{0.4}Hf_{0.4}In_{0.4}Nb_{0.4}Sn_{0.4}O_{12}$,
$Li_{7.1}La_{2.9}Ba_{0.1}Zr_{0.3}Hf_{0.5}In_{0.3}Nb_{0.5}Sn_{0.4}O_{12}$,
$Li_{7.1}La_{2.9}Ba_{0.1}Zr_{0.5}Hf_{0.3}Sc_{0.5}Nb_{0.3}Sn_{0.4}O_{12}$,
$Li_{7.1}La_{2.9}Ba_{0.1}Zr_{0.3}Hf_{0.5}In_{0.4}Nb_{0.3}Sn_{0.5}O_{12}$,
$Li_{7.1}La_{2.9}Ba_{0.1}Zr_{0.5}Hf_{0.3}Sc_{0.4}Nb_{0.5}Sn_{0.3}O_{12}$,
$Li_{7.1}La_{2.9}Ba_{0.1}Zr_{0.4}Hf_{0.4}Sc_{0.4}Nb_{0.4}Sn_{0.4}O_{12}$,
$Li_{7.1}La_{2.9}Ba_{0.1}Zr_{0.3}Hf_{0.5}Sc_{0.3}Nb_{0.5}Sn_{0.4}O_{12}$,
$Li_{7.1}La_{2.9}Ba_{0.1}Zr_{0.5}Hf_{0.3}Sc_{0.5}Nb_{0.3}Sn_{0.4}O_{12}$,
$Li_{7.1}La_{2.9}Ba_{0.1}Zr_{0.3}Hf_{0.5}Sc_{0.4}Nb_{0.3}Sn_{0.5}O_{12}$,
$Li_{7.1}La_{2.9}Ba_{0.1}Zr_{0.5}Hf_{0.3}Sc_{0.4}Nb_{0.5}Sn_{0.3}O_{12}$,
$Li_{6.8}La_3Zr_{0.4}Hf_{0.4}Sn_{0.4}Sc_{0.4}Nb_{0.4}O_{11.8}F_{0.2}$,
$Li_{6.8}La_3Zr_{0.3}Hf_{0.5}Sn_{0.3}Sc_{0.5}Nb_{0.4}O_{11.8}F_{0.2}$,
$Li_{6.8}La_3Zr_{0.5}Hf_{0.3}Sn_{0.5}Sc_{0.3}Nb_{0.4}O_{11.8}F_{0.2}$,
$Li_{6.8}La_3Zr_{0.3}Hf_{0.5}Sn_{0.4}Sc_{0.3}Nb_{0.5}O_{11.8}F_{0.2}$,
$Li_{6.8}La_3Zr_{0.5}Hf_{0.3}Sn_{0.4}Sc_{0.5}Nb_{0.3}O_{11.8}F_{0.2}$,
$Li_7La_3Zr_{0.4}Hf_{0.4}Al_{0.4}Nb_{0.4}Sn_{0.4}O_{12}$,
$Li_{7.0}La_{2.9}Y_{0.1}Zr_{0.4}Hf_{0.4}Sc_{0.4}Nb_{0.4}Sn_{0.4}O_{12}$,
$Li_7La_3Zr_{0.5}Hf_{0.5}Al_{0.5}Nb_{0.5}O_{12}$,
$Li_{6.8}La_3Zr_{0.4}Hf_{0.4}Sn_{0.4}Sc_{0.4}Nb_{0.4}O_{11.8}Cl_{0.2}$, or
a combination thereof.

16. A method of preparing an oxide, the method comprising:
providing a precursor mixture comprising a lithium precursor, optionally, an M1 precursor, an M2 precursor, an M3 precursor, and optionally an X precursor; and
heat-treating the precursor mixture in an oxidizing gas to prepare a compound represented by Formula 1

$$(Li_xM1_y)(M2)_{3-\delta}(M3)_{2-\omega}O_{12-z}X_z \quad \text{Formula 1}$$

wherein, in Formula 1,
$6 \le x \le 8$, $0 \le y < 2$, $-0.2 \le \delta \le 0.2$, $-0.2 \le \omega \le 0.2$, and $0 \le z \le 2$;
M1 is a monovalent cation, a divalent cation, a trivalent cation, or a combination thereof,
M2 is a monovalent cation, a divalent cation, a trivalent cation, or a combination thereof,
M3 is a monovalent cation, a divalent cation, a trivalent cation, a tetravalent cation, a pentavalent cation, a hexavalent cation, or a combination thereof, and
wherein at least one of M1, M2, or M3 comprises at least four elements; and
X is a monovalent anion, a divalent anion, a trivalent anion, or a combination thereof.

17. The method of claim 16, wherein the heat-treating of the precursor mixture comprises heat-treating at a temperature of about 600° C. to about 1100° C.

18. The method of claim 16, further comprising milling the precursor mixture prior to the heat-treating of the precursor mixture.

19. The method of claim 16, further comprising:
pressing the heat-treated precursor mixture to form a pellet; and
heat-treating the pellet at a temperature in a range of about 900° C. to about 1500° C.

20. The method of claim 19, wherein the heat-treating of the pellet comprises heat-treating at a temperature greater than a temperature of the heat-treating of the precursor mixture.

21. A solid electrolyte comprising:
the oxide of claim 1.

22. An electrochemical device comprising:
a cathode;
an anode; and
a solid electrolyte;
wherein the cathode, the anode, the solid electrolyte, or a combination thereof, comprises the oxide of claim 1.

23. The electrochemical device of claim 22, wherein the solid electrolyte is between the cathode and the anode.

24. The electrochemical device of claim 22,
wherein the solid electrolyte is in the form of a protective layer, and
wherein the protective layer is on the cathode, the anode, or a combination thereof or the solid electrolyte is an electrolyte protective layer.

25. The electrochemical device of claim 22, wherein the electrochemical device is an all-solid battery.

26. An oxide comprising a compound represented by Formula 1:

$$(Li_xM1_y)(M2)_{3-\delta}(M3)_{2-\omega}O_{12-z}X_z \quad \text{Formula 1}$$

wherein, in Formula 1,
$6 \le x \le 8$, $0 \le y < 2$, $-0.2 \le \delta \le 0.2$, $-0.2 \le \omega \le 0.2$, and $0 \le z \le 2$;
M1 is hydrogen, iron, gallium, aluminum, boron, beryllium, or a combination thereof;
M2 is lanthanum, barium, or a combination thereof; and
M3 is zirconium, hafnium, tin, niobium, scandium, indium, or a combination thereof;

wherein M3 comprises at least four elements wherein the at least four elements of M3 occupy the M3 crystallographic site; and X is a halogen, a pseudohalogen, or a combination thereof.

27. An oxide comprising a compound represented by Formula 1:

$$(Li_xM1_y)(M2)_{3-\delta}(M3)_{2-\omega}O_{12-z}X_z \quad \text{Formula 1}$$

wherein, in Formula 1, $6 \leq x \leq 8$, $0 \leq y < 2$, $-0.2 \leq \delta \leq 0.2$, $-0.2 \leq \omega \leq 0.2$, and $0 < z \leq 2$;

M1 is a monovalent cation, a divalent cation, a trivalent cation, or a combination thereof;

M2 is a monovalent cation, a divalent cation, a trivalent cation, or a combination thereof;

M3 is a monovalent cation, a divalent cation, a trivalent cation, a tetravalent cation, a pentavalent cation, a hexavalent cation, or a combination thereof;

wherein at least one of M1, M2, or M3 comprises at least four elements; and

X is a monovalent anion, a divalent anion, a trivalent anion, or a combination thereof.

28. The oxide of claim 27, wherein the oxide is
$Li_{6.8}La_3Zr_{0.4}Hf_{0.4}Sn_{0.4}Sc_{0.4}Nb_{0.4}O_{11.8}F_{0.2}$,
$Li_{6.8}La_3Zr_{0.3}Hf_{0.5}Sn_{0.3}Sc_{0.5}Nb_{0.4}O_{11.8}F_{0.2}$,
$Li_{6.8}La_3Zr_{0.5}Hf_{0.3}Sn_{0.5}Sc_{0.3}Nb_{0.4}O_{11.8}F_{0.2}$,
$Li_{6.8}La_3Zr_{0.3}Hf_{0.5}Sn_{0.4}Sc_{0.3}Nb_{0.5}O_{11.8}F_{0.2}$,
$Li_{6.8}La_3Zr_{0.5}Hf_{0.3}Sn_{0.4}Sc_{0.5}Nb_{0.3}O_{11.8}F_{0.2}$,
$Li_7La_3Zr_{0.4}Hf_{0.4}Al_{0.4}Nb_{0.4}Sn_{0.4}O_{12}$,
$Li_{7.0}La_{2.9}Y_{0.1}Zr_{0.4}Hf_{0.4}Sc_{0.4}Nb_{0.4}Sn_{0.4}O_{12}$,
$Li_7La_3Zr_{0.5}Hf_{0.5}Al_{0.5}Nb_{0.5}O_{12}$,
$Li_{6.8}La_3Zr_{0.4}Hf_{0.4}Sn_{0.4}Sc_{0.4}Nb_{0.4}O_{11.8}Cl_{0.2}$.

29. An electrochemical device comprising:

a cathode;

an anode; and a solid electrolyte;

wherein the cathode, the anode, the solid electrolyte, or a combination thereof, comprises the oxide of claim 27.

* * * * *